(12) United States Patent
Murata

(10) Patent No.: US 12,542,152 B2
(45) Date of Patent: Feb. 3, 2026

(54) MAGNETIC TAPE CONTROL SYSTEM AND MAGNETIC TAPE CONTROL DEVICE

(71) Applicant: FUJIFILM Corporation, Tokyo (JP)

(72) Inventor: Yuto Murata, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/161,478

(22) Filed: Jan. 30, 2023

(65) Prior Publication Data

US 2023/0178101 A1 Jun. 8, 2023

Related U.S. Application Data

(63) Continuation of application No. PCT/JP2021/028011, filed on Jul. 29, 2021.

(30) Foreign Application Priority Data

Jul. 31, 2020 (JP) ................. 2020-130862

(51) Int. Cl.
*G11B 5/17* (2006.01)
*G11B 15/32* (2006.01)

(52) U.S. Cl.
CPC ........... *G11B 5/17* (2013.01); *G11B 15/32* (2013.01); *G11B 2220/90* (2013.01)

(58) Field of Classification Search
None
See application file for complete search history.

(56) References Cited

U.S. PATENT DOCUMENTS

| 4,249,710 A | * | 2/1981 | Dobbs | G11B 23/087 |
| 4,526,330 A | * | 7/1985 | Shimizu | G11B 23/087 |
| 5,850,985 A | | 12/1998 | Higuchi et al. | |

(Continued)

FOREIGN PATENT DOCUMENTS

| CN | 1145683 A | 3/1997 |
| CN | 110176255 A | 8/2019 |

(Continued)

OTHER PUBLICATIONS

International Search Report dated Oct. 26, 2021 issued by the International Searching Authority in Application No. PCT/JP2021/028011.

(Continued)

*Primary Examiner* — William J Klimowicz
(74) *Attorney, Agent, or Firm* — Sughrue Mion, PLLC

(57) ABSTRACT

Provided are a magnetic tape control system that executes pre-rewinding storage of storing a magnetic tape in a state of being wound around a reel, and post-rewinding storage of storing the magnetic tape in a state of being rewound around a reel different from or the same reel as the reel after the pre-rewinding storage such that an end that is a tape outside end during the pre-rewinding storage is turned into a tape inside end and an end that is a tape inside end during the pre-rewinding storage is turned into a tape outside end, and a magnetic tape control device including a rewinding control unit that transmits rewinding execution information, and a drive unit that receives the rewinding execution information and starts running of a magnetic tape stored in a state of being wound around a reel to execute rewinding of the magnetic tape.

16 Claims, 10 Drawing Sheets

(56) References Cited

U.S. PATENT DOCUMENTS

| 10,460,757 | B1 | | 10/2019 | Judd et al. | |
|---|---|---|---|---|---|
| 2006/0072235 | A1 | | 4/2006 | Kuse et al. | |
| 2011/0122522 | A1 | * | 5/2011 | Itagaki | G11B 27/032 |
| 2019/0259417 | A1 | | 8/2019 | Kagawa et al. | |
| 2020/0005818 | A1 | | 1/2020 | Kasada et al. | |

FOREIGN PATENT DOCUMENTS

| EP | 0893795 | A2 | * | 1/1999 | | G11B 15/60 |
|---|---|---|---|---|---|---|
| JP | 5-225667 | A | | 9/1993 | | |
| JP | 9-97459 | A | | 4/1997 | | |
| JP | 2000021048 | A | * | 1/2000 | | |
| JP | 2008-59716 | A | | 3/2008 | | |
| JP | 2008135088 | A | * | 6/2008 | | |
| JP | 2010-250910 | A | | 11/2010 | | |
| JP | 2020-9524 | A | | 1/2020 | | |
| KR | 950003211 | B1 | * | 4/1995 | | G11B 23/087 |
| KR | 19980042048 | A | * | 8/1998 | | G11B 23/02 |

OTHER PUBLICATIONS

Written Opinion dated Oct. 26, 2021 issued by the International Searching Authority in Application No. PCT/JP2021/028011, See IPRP.

International Preliminary Report on Patentability dated Jan. 31, 2023 with a Translation of the Written Opinion of the International Searching Authority in Application No. PCT/JP2021/028011.

Office Action dated Aug. 8, 2023 in Japanese Application No. 2020-130862.

Office Action dated Mar. 28, 2025 in Chinese Application No. 202180058735.8.

Office Action issued Jun. 25, 2025 in Chinese Application No. 202180058735.8.

Office Action issued Nov. 27, 2025 in Chinese Application No. 202180058735.8.

* cited by examiner

MAGNETIC TAPE CONTROL SYSTEM AND MAGNETIC TAPE CONTROL DEVICE

CROSS-REFERENCE TO RELATED APPLICATIONS

This application is a Continuation of PCT International Application No. PCT/JP2021/028011 filed on Jul. 29, 2021, which claims priority under 35 U.S.C. § 119(a) to Japanese Patent Application No. 2020-130862 filed on Jul. 31, 2020. Each of the above applications is hereby expressly incorporated by reference, in its entirety, into the present application.

BACKGROUND OF THE INVENTION

1. Field of the Invention

The present invention relates to a magnetic tape control system and a magnetic tape control device.

2. Description of the Related Art

Magnetic recording mediums include a tape-shaped magnetic recording medium and a disk-shaped magnetic recording medium, and the tape-shaped magnetic recording medium, that is, a magnetic tape is mainly used for the purpose of data storage, such as data backup or archives (for example, see U.S. Ser. No. 10/460,757B and JP2010-250910A).

SUMMARY OF THE INVENTION

Recording of data on the magnetic tape is normally performed by making the magnetic tape run in a magnetic tape device (generally referred to as a "drive") and making a magnetic head follow a data band of the magnetic tape to record data on the data band. With this, a data track is formed on the data band. In reproduction of recorded data, normally, the magnetic tape is made to run in the magnetic tape device and the magnetic head is made to follow the data band of the magnetic tape to read data recorded on the data band. After such recording or reproduction, the magnetic tape is stored in a state of being wound around a reel (hereinafter, also referred to as a "cartridge reel") in the magnetic tape cartridge until next recording and/or reproduction is performed.

During recording and/or reproduction after the storage, in a case where the magnetic head that records and/or reproduces data deviates from a target track position due to deformation of the magnetic tape and records and/or reproduces data, a phenomenon of recording failure (for example, overwriting on recorded data), reproduction failure (for example, reading failure of data), or the like occurs. On the other hand, in recent years, in the field of data storage, there is an increasing need for long-term storage of data, called an archive. Note that, in general, as a storage period increases, the magnetic tape tends to be easily deformed. Accordingly, it is expected that suppression of the occurrence of the above-described phenomenon after the storage will be further required in the future.

In view of the above, an aspect of the present invention is to provide a unit that allows satisfactory recording and/or reproduction in recording and/or reproduction of data on a magnetic tape after storage.

An aspect of the present invention relates to a magnetic tape control system that executes pre-rewinding storage of storing a magnetic tape in a state of being wound around a reel, and post-rewinding storage of storing the magnetic tape in a state of being rewound around a reel different from or the same reel as the reel after the pre-rewinding storage such that an end that is a tape outside end during the pre-rewinding storage is turned into a tape inside end and an end that is a tape inside end during the pre-rewinding storage is turned into a tape outside end.

In one embodiment, the magnetic tape control system may execute the pre-rewinding storage after at least one of recording of data on the magnetic tape or reproduction of data recorded on the magnetic tape is performed.

In one embodiment, the magnetic tape control system may determine an execution time of the post-rewinding storage based on a measurement result regarding a tape width of the magnetic tape subjected to the pre-rewinding storage.

In one embodiment, the magnetic tape control system may determine the execution time of the post-rewinding storage based on a comparison result of comparing the measurement result regarding the tape width of the magnetic tape subjected to the pre-rewinding storage with a measurement result regarding a tape width of the magnetic tape before being subjected to the pre-rewinding storage.

In one embodiment, the magnetic tape control system may store the measurement result regarding the tape width of the magnetic tape before being subjected to the pre-rewinding storage, in a data storage region of the magnetic tape control system.

In one embodiment, the data storage region may be a storage medium different from the magnetic tape.

In one embodiment, the storage medium may be a cartridge memory in a magnetic tape cartridge.

In one embodiment, the data storage region may be a partial region of the magnetic tape.

In one embodiment, the magnetic tape control system may further comprise a rewinding control unit that transmits rewinding execution information, and a drive unit that receives the rewinding execution information and starts running of the magnetic tape to execute the rewinding.

Another aspect of the present invention relates to a magnetic tape control device comprising a rewinding control unit that transmits rewinding execution information, and a drive unit that receives the rewinding execution information and starts running of a magnetic tape stored in a state of being wound around a reel, to execute rewinding of the magnetic tape, in which the rewinding winds the magnetic tape around a reel different from or the same reel as the reel around which the magnetic tape is wound before the rewinding such that an end that is a tape outside end before the rewinding is turned into a tape inside end and an end that is a tape inside end before the rewinding is turned into a tape outside end.

In one embodiment, the rewinding control unit may determine a transmission time of the rewinding execution information based on a measurement result regarding a tape width of the magnetic tape stored in a state of being wound around the reel before the rewinding.

In one embodiment, the rewinding control unit may determine the transmission time of the rewinding execution information based on a comparison result of comparing the measurement result regarding the tape width of the magnetic tape stored in a state of being wound around the reel before the rewinding with a measurement result regarding a tape width of the magnetic tape before being stored in a state of being wound around the reel.

In one embodiment, the rewinding control unit may read out the measurement result regarding the tape width of the magnetic tape before being stored in a state of being wound around the reel, from a data storage region where the measurement result regarding the tape width is stored.

In one embodiment, the data storage region may be a storage medium different from the magnetic tape.

In one embodiment, the storage medium may be a cartridge memory in a magnetic tape cartridge.

In one embodiment, the data storage region may be a partial region of the magnetic tape.

Examples of embodiments that can be taken for the magnetic tape control system and the magnetic tape control device include the following embodiments.

In one embodiment, the magnetic tape may be a magnetic tape on which data is recorded at a track pitch equal to or less than 2.0 μm.

In one embodiment, the reel around which the magnetic tape is wound by the rewinding may be a reel different from the reel around which the magnetic tape is wound before the rewinding.

In one embodiment, the reel around which the magnetic tape is wound by the rewinding and the reel around which the magnetic tape is wound before the rewinding may be reels that are accommodated in the same magnetic tape cartridge.

In one embodiment, out of the reel around which the magnetic tape is wound by the rewinding and the reel around which the magnetic tape is wound before the rewinding, one reel may be a cartridge reel of a magnetic tape cartridge, and the other reel may be a reel around which the magnetic tape is wound during recording and reproduction. In the present invention and the present specification, "recording and reproduction" means "recording of data", "reproduction of data", or "recording of data and reproduction of data".

In one embodiment, the other reel may be a winding reel that is provided in a magnetic tape device including a magnetic head.

In one embodiment, the other reel may be a cartridge reel of a magnetic tape cartridge different from the magnetic tape cartridge having the one cartridge reel.

In one embodiment, the reel around which the magnetic tape is wound by the rewinding and the reel around which the magnetic tape is wound before the rewinding may be reels that are provided in a magnetic tape device including a magnetic head.

In one embodiment, out of the reel around which the magnetic tape is wound by the rewinding and the reel around which the magnetic tape is wound before the rewinding, one reel may be a cartridge reel of a magnetic tape cartridge, and the other reel may be a winding reel that is provided in a winding device.

According to the aspect of the present invention, it is possible to allow satisfactory recording and/or reproduction in recording and/or reproduction of data on a magnetic tape after storage.

DESCRIPTION OF THE PREFERRED EMBODIMENTS

[Magnetic Tape Control System]

Figure 1:
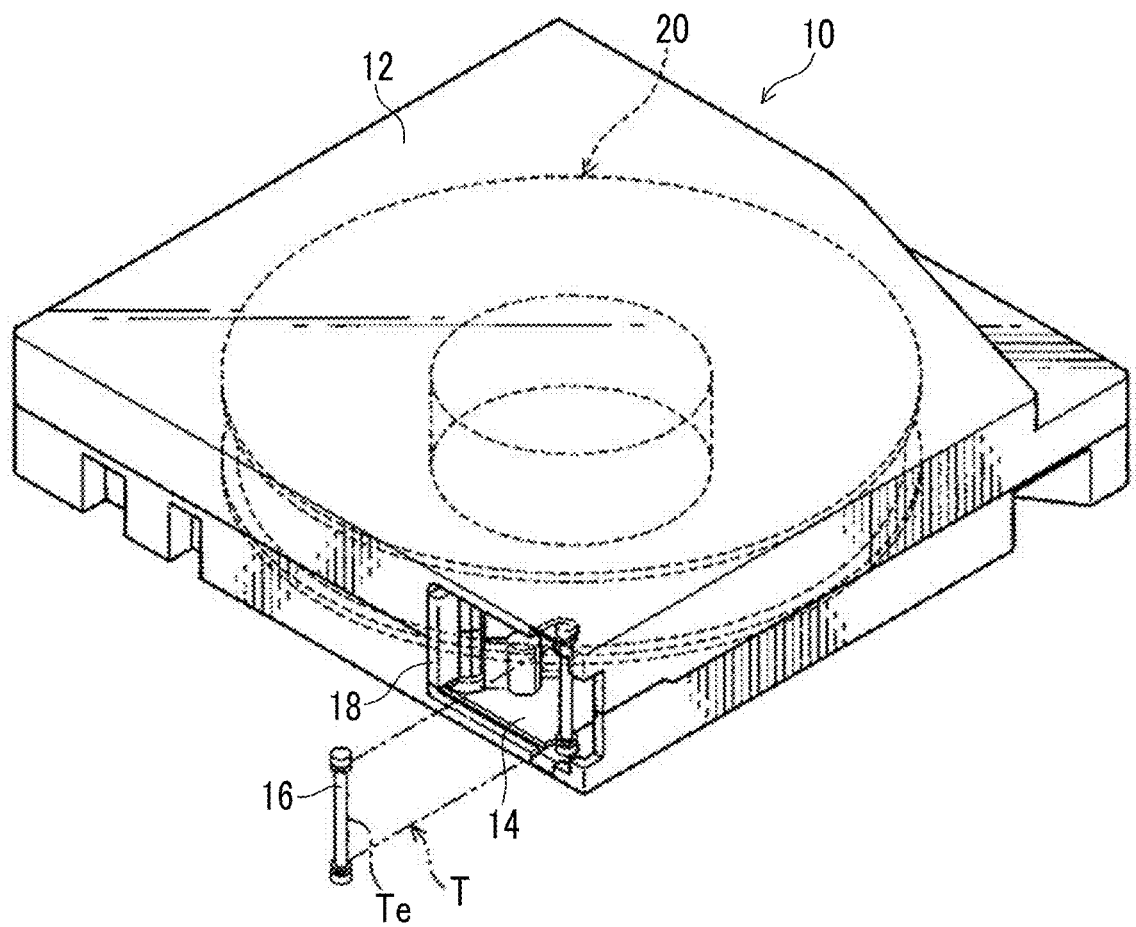
FIG. 1 is a perspective view of an example of a magnetic tape cartridge.

An aspect of the present invention relates to a magnetic tape control system. The magnetic tape control system executes pre-rewinding storage of storing a magnetic tape in a state of being wound around a reel, and post-rewinding storage of storing the magnetic tape in a state of being rewound around a reel different from or the same reel as the above-described reel after the pre-rewinding storage such that an end that is a tape outside end during the pre-rewinding storage is turned into a tape inside end and an end that is a tape inside end during the pre-rewinding storage is turned into a tape outside end.

In the present invention and the present specification, the "tape inside end" is an end of a starting point of winding around the reel out of two ends (that is, end portions) of the magnetic tape, and the other end is the "tape outside end". Accordingly, in a state of being wound around the reel, the tape inside end can be an end closest to the reel and the tape outside end can be an end farthest from the reel, in the magnetic tape.

In the present invention and the present specification, "a state wound around a reel" for the magnetic tape includes a state in which a total length of the magnetic tape is wound around one reel, and a state in which a part of the total length of the magnetic tape is wound around the reel with one of two ends of the magnetic tape as a starting point, and the other part (a portion including the other end) is not present on the reel.

In the latter state, the portion including the other end of the magnetic tape can be present on, for example, another reel, and can be in a state of being wound around another reel with the other end as a starting point. Accordingly, in pre-rewinding storage and/or post-rewinding storage that will be described below in detail, a tape length wound around the reel with one end (tape inside end) of the magnetic tape as a starting point can be total length of the magnetic tape in one embodiment, and can be a part of the total length of the magnetic tape in another embodiment. In a case of performing pre-rewinding storage and/or post-rewinding storage in a state in which a part of the total length of the magnetic tape is wound around the reel, a tape length of the portion wound around the reel is preferably equal to or greater than 80% of a data recording region of the magnetic tape, more preferably equal to or greater than 90%, and still more preferably equal to or greater than 95%.

In pre-rewinding storage, in a case where a part including one end of the total length of the magnetic tape is wound around a certain reel, and a part including the other end is present on or is wound around another reel, a reel around which the magnetic tape is wound during pre-rewinding storage is a reel around which more portion of the magnetic tape is wound. In post-rewinding storage, in a case where a part including one end of the total length of the magnetic tape is wound around a reel for rewinding, and a part including the other end is present on or is wound around a reel around which the magnetic tape is wound before rewinding, more portion of the magnetic tape is preferably wound around the reel for rewinding.

An example of a shipping form of the magnetic tape is a form in which the magnetic tape is shipped while being accommodated in a magnetic tape cartridge. The magnetic tape cartridge is normally produced by winding and accommodating a magnetic tape obtained by slitting an elongated magnetic tape raw material at a predetermined width, around a reel of a magnetic tape cartridge.

On the other hand, an example of an embodiment of recording of data on the magnetic tape is the following embodiment.

The magnetic tape cartridge in which the magnetic tape is accommodated is attached to a magnetic tape device (drive), and the magnetic tape is made to run in between a reel (referred to as a "cartridge reel") in the magnetic tape cartridge and a winding reel in the magnetic tape device, whereby it is possible to perform recording of data on the magnetic tape and/or reproduction of recorded data. After recording or reproduction of data, the magnetic tape is unwound to the reel and is stored in a state of being wound around the reel in the magnetic tape cartridge until next recording and/or reproduction is performed.

It is surmised that, in the magnetic tape that is stored in a state of being wound around the reel, different deformation occurs depending on the position in such a manner that a portion close to the reel is deformed to be wider than an initial state and a portion far from the reel is deformed to be narrower than the initial state. The present inventors have considered that such deformation occurs due to creep deformation mainly caused by tape winding stress. The present inventors have surmised that such deformation occurs more prominently in a case where the magnetic tape is stored for a long period and/or under a high temperature environment in a state of being wound around the reel.

It is considered that the occurrence of the deformation described above may cause the magnetic head to deviate from a target track position and to perform recording and/or reproduction of data during recording and/or reproduction after storage. Since a data track width is narrowed as the magnetic tape has a high capacity, the phenomenon that the magnetic head deviates from the target track position and performs recording and/or reproduction of data tends to more easily occur.

In regard to a countermeasure against tape deformation, U.S. Ser. No. 10/460,757B described above has suggested adjustment of tension that is applied to a magnetic tape (Claim 12 of U.S. Ser. No. 10/460,757B) and the like. JP2010-250910A describes that a layer made of metal or a metal-based inorganic compound in a support for a magnetic recording medium, thereby easily achieving preferred ranges of both change in hygrothermal environment and change in dimension of the magnetic recording medium (see Paragraph 0043 of JP2010-250910A).

In contrast, the present inventors have conducted intensive studies and have reached performing "rewinding" based on an idea different from the above-described countermeasure. In detail, after storing (pre-rewinding storage) the magnetic tape in a state of being wound around the reel, the magnetic tape control system executes post-rewinding storage of storing the magnetic tape in a state of being rewound around a reel different from or the same reel as the reel around which the magnetic tape is wound in pre-rewinding storage such that an end that is a tape outside end during pre-rewinding storage is turned into a tape inside end and an end that is a tape inside end during pre-rewinding storage is turned into a tape outside end. As described above, during storage in a state of being wound around the reel, in the magnetic tape, a portion close to the reel is deformed to be wider than the initial state, and a portion far from the reel is deformed to be narrower than the initial state. Accordingly, in the magnetic tape control system, post-rewinding storage is performed by wounding the magnetic tape such that the end that is a tape outside end during pre-rewinding storage is turned into a tape inside end and an end that is a tape inside end during pre-rewinding storage is turned into a tape outside end. With this, the present inventors have considered that, since creep deformation in a direction opposite to pre-rewinding storage can be caused, a portion that is deformed to be wide in pre-rewinding storage can be deformed narrow during post-rewinding storage, and a portion that is deformed to be narrow in pre-rewinding storage can be deformed to be wide during post-rewinding storage. Thus, the present inventors have surmised that a portion deformed during pre-rewinding storage can be brought close to a state before deformation, and as a result, it is possible to suppress the occurrence of recording failure and/or reproduction failure dur to tape deformation during storage.

Hereinafter, the magnetic tape control system will be described in more detail. In the following description, features may be described referring to the drawings. Note that an embodiment shown in the drawings is illustrative, and the present invention is not limited to the illustrated embodiment.

<Magnetic Tape Cartridge>

In one embodiment, a magnetic tape is shipped in a state of being accommodated in a magnetic tape cartridge, the magnetic tape cartridge is attached to a magnetic tape device comprising a magnetic head, and the magnetic tape is made to run in the magnetic tape device to perform recording of data on the magnetic tape and/or to perform reproduction of data recorded on the magnetic tape. In another embodiment, a magnetic tape is shipped in a state of being accommodated in a magnetic tape device comprising a magnetic head, and the magnetic tape is made to run in the magnetic tape device to perform recording of data on the magnetic tape and/or to perform reproduction of data recorded on the magnetic tape.

In the magnetic tape cartridge, the magnetic tape is accommodated inside a cartridge main body in a state of being wound around a reel. The reel of the magnetic tape cartridge is configured with at least a reel hub, and normally, flanges are provided in both end portions of the reel hub, respectively. The reel hub is a cylindrical member that configures an axial center portion around which the magnetic tape is wound. The reel is provided to be rotatable inside the cartridge main body. As the magnetic tape cartridge, a single reel type magnetic tape cartridge in which one reel is provided inside the cartridge main body and a twin reel type magnetic tape cartridge in which two reels are provided inside the cartridge main body are widely used. In a case where the single reel type magnetic tape cartridge is mounted in the magnetic tape device for recording or reproduction of data on the magnetic tape, the magnetic tape cartridge is drawn out from the magnetic tape and wound around a reel (winding reel) provided in the magnetic tape device. A magnetic head is disposed in a magnetic tape transport path from the magnetic tape cartridge to the winding reel. Sending and winding of the magnetic tape are performed between the reel (supply reel) of the magnetic tape cartridge and the reel (winding reel) of the magnetic tape device. In the meantime, recording of data on the magnetic tape and/or reproduction of data recorded on the magnetic tape is performed by the magnetic head. In contrast, in the twin reel type magnetic tape cartridge, both reels of a supply reel and a winding reel are provided inside the magnetic tape cartridge.

Hereinafter, a configuration example of the magnetic tape cartridge will be described referring to the drawings.

FIG. 1 is a perspective view of an example of the magnetic tape cartridge. FIG. 1 shows a single reel type magnetic tape cartridge.

A magnetic tape cartridge 10 shown in FIG. 1 has a case 12. The case 12 is formed in a rectangular box shape. The case 12 is made of, for example, resin, such as polycarbonate. Inside the case 12, only one reel 20 is rotatably accommodated.

Figure 2:
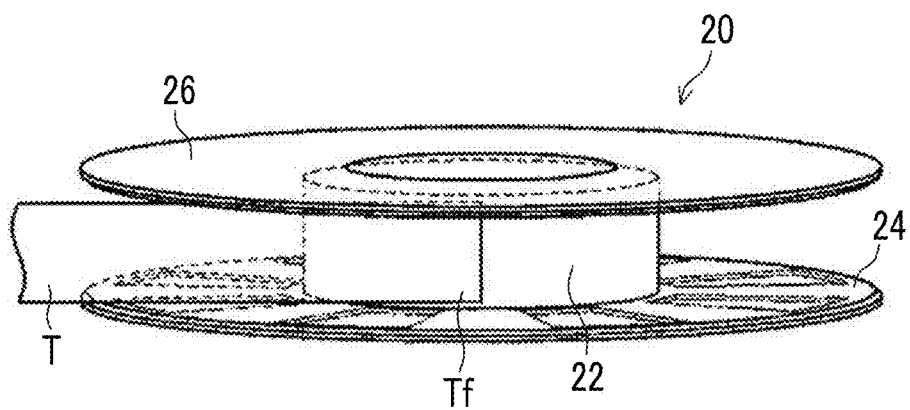
FIG. 2 is a perspective view of a case where winding of a magnetic tape around a reel is started.
Figure 3:
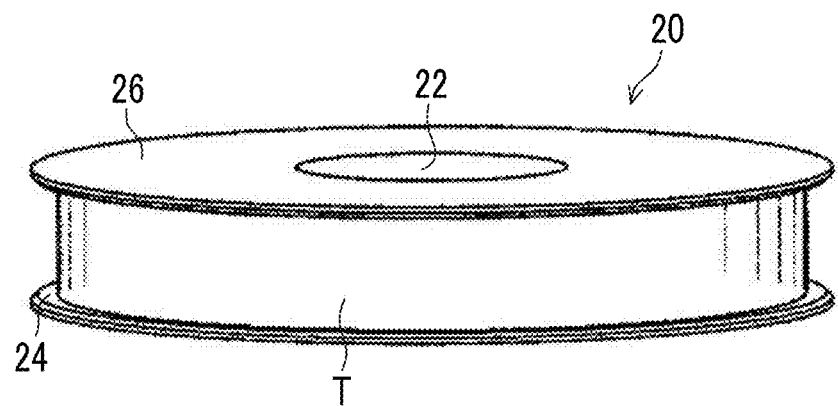
FIG. 3 is a perspective view of a case where winding of the magnetic tape around the reel ends.

FIG. 2 is a perspective view of a case where winding of the magnetic tape around the reel is started. FIG. 3 is a perspective view of a case where winding of the magnetic tape around the reel ends.

The reel (also referred to as a "cartridge reel") 20 has a reel hub 22. In both end portions of the reel hub 22, flanges (lower flange 24 and upper flange 26) that protrude outward in a radial direction from a lower end portion and an upper end portion of the reel hub 22, respectively, are provided. Here, in regard to "upper" and "lower", in a case where the magnetic tape cartridge is mounted in the magnetic tape device, a side positioned above is referred to as "upper", and a side positioned below is referred to as "lower". One or both of the lower flange 24 and the upper flange 26 is preferably configured integrally with the reel hub 22 from a viewpoint of reinforcing the upper end portion side and/or the lower end portion side of the reel hub 22. The term "integrally configured" means configured as one member, not as separate members. In a first embodiment, the reel hub 22 and the upper flange 26 are configured as one member, and the member is joined to the lower flange 24 configured as a separate member by a known method. In a second embodiment, the reel hub 22 and the lower flange 24 are configured as one member, and the member is joined to the upper flange 26 configured as a separate member by a known method. The reel of the magnetic tape cartridge may be any embodiment. Each member can be manufactured by a known molding method, such as injection molding.

A magnetic tape T is wound around an outer periphery of the reel hub 22 with a tape inside end Tf (see FIG. 2) as a starting point.

A side wall of the case 12 has an opening 14 for drawing out the magnetic tape T wound around the reel 20, and a leader pin 16 that is drawn out while being locked by a drawing member (not shown) of the magnetic tape device (not shown) is fixed to a tape outside end Te of the magnetic tape T that is drawn out from the opening 14.

The opening 14 is opened and closed by a door 18. The door 18 is formed in a rectangular plate shape having a size capable of closing the opening 14, and is biased by a biasing member (not shown) in a direction of closing the opening 14. Then, in a case where the magnetic tape cartridge 10 is mounted in the magnetic tape device, the door 18 is opened against biasing force of the biasing member.

The above-described embodiment is illustrative, and a known technique can be applied for the details of the magnetic tape cartridge. A total length of the magnetic tape that is accommodated in the magnetic tape cartridge is not particularly limited, and can be in a range of, for example, about 800 m to 2500 m. A tape total length accommodated in one reel of the magnetic tape cartridge is preferably long from a viewpoint of a high capacity of the magnetic tape cartridge. Note that the magnetic tape control system is not limited to the embodiment in which the magnetic tape is accommodated in the magnetic tape cartridge. In regard to other embodiments, the following description can be referred to.

<Magnetic Tape>

The magnetic tape subjected to pre-rewinding storage and post-rewinding storage in the magnetic tape control system is not particularly limited, and can be, for example, a magnetic tape having a nonmagnetic support and a magnetic layer containing ferromagnetic powder. The magnetic tape can have a nonmagnetic layer containing nonmagnetic powder between the nonmagnetic support and the magnetic layer, and can also have a back coating layer containing nonmagnetic powder on a surface side opposite to a surface side of the nonmagnetic support having the magnetic layer. In general, the magnetic tape is broadly classified into a coating type and a metal thin film type. The magnetic tape may be a coating type magnetic tape or may be a metal thin film type magnetic tape. In the coating type magnetic tape, the magnetic layer, the nonmagnetic layer, and the back coating layer contain a binding agent, and can optionally contain one kind or more of additives. The metal thin film type magnetic tape can have, for example, a magnetic layer formed by a sputtering method. A known technique can be applied to the magnetic tape subjected to pre-rewinding storage and post-rewinding storage in the magnetic tape control system.

From a viewpoint of high-density recording, a track pitch is preferably equal to or less than 2.0 μm in recording of data on the magnetic tape. The track pitch can be, for example, in a range of 0.05 μm to 2.0 μm. In the present invention and the present specification, the "track pitch" refers to an inter-center portion distance of two adjacent data tracks.

(Servo Pattern)

In the magnetic tape, normally, a servo pattern is formed. "Formation of the servo pattern" can also be referred to as "recording of a servo signal". Hereinafter, the formation of the servo pattern will be described.

The servo pattern is normally formed along a longitudinal direction of the magnetic tape. Examples of a system of control (servo control) using a servo signal include timing-based servo (TBS), amplitude servo, and frequency servo.

As shown in European Computer Manufacturers Association (ECMA)-319 (June 2001), the timing-based servo system is employed in a magnetic tape (in general, referred to as an "LTO tape") conforming to linear tape-open (LTO) standard. In the timing-based servo system, the servo pattern is configured by continuously disposing a plurality of pairs of magnetic stripes (also referred to as "servo stripes" not parallel to each other in the longitudinal direction of the magnetic tape. The servo system is a system that performs head tracking using a servo signal. In the present invention and the present specification, a "timing-based servo pattern" refers to a servo pattern that enables head tracking in a servo system of a timing-based servo system. As described above, the reason for that the servo pattern is configured with a pair of magnetic stripes not parallel to each other is because a servo signal reading element passing on the servo pattern recognizes a passage position thereof. Specifically, a pair of magnetic stripes is formed such that an interval thereof is continuously changed along a width direction of the magnetic tape, and the servo signal reading element reads the interval, so that a relative position of the servo pattern and the servo signal reading element can be recognized. Information of the relative position enables tracking of a data track. To this end, a plurality of servo tracks are normally set on the servo pattern along the width direction of the magnetic tape.

A servo band is configured with servo patterns that are continuous in the longitudinal direction of the magnetic tape. A plurality of servo bands are normally provided on the magnetic tape. For example, in the LTO tape, the number of servo bands is five. A region interposed between two adjacent servo bands is a data band. The data band is configured with a plurality of data tracks, and each data track corresponds to each servo track.

In one embodiment, as shown in JP2004-318983A, information (also referred to as "servo band identification (ID)" or "Unique DataBand Identification Method (UDIM) information") indicating a number of a servo band is embedded in each servo band. The servo band ID is recorded by shifting a specific servo stripe among a plurality of pairs of servo stripes in the servo band such that a position thereof is relatively displaced in the longitudinal direction of the magnetic tape. Specifically, the position of the shifted specific servo stripe among a plurality of pairs of servo stripes is changed for each servo band. With this, since the recorded servo band ID is unique for each servo band, only by reading one servo band by the servo signal reading element, the servo band can be uniquely specified.

A method of uniquely specifying a servo band is a method using a staggered system as shown in ECMA-319 (June 2001). In the staggered system, a plurality of groups of a pair of magnetic stripes (servo stripes) not parallel to each other that are continuously disposed in the longitudinal direction of the magnetic tape are recorded to be shifted in the longitudinal direction of the magnetic tape for each servo band. A combination of the shifted servo stripes between adjacent servo bands is unique in the entire magnetic tape, so that the servo band can also be uniquely specified in reading the servo pattern by two servo signal reading elements.

As shown in ECMA-319 (June 2001), information (also referred to as "longitudinal position (LPOS) information") indicating a position in the longitudinal direction of the magnetic tape is also embedded in each servo band. The LPOS information is also recorded by shifting the position of a pair of servo stripes in the longitudinal direction of the magnetic tape in the same manner as the UDIM information. Note that, unlike the UDIM information, in the LPOS information, the same signal is recorded in each servo band.

Other information different from the UDIM information and the LPOS information described above can also be embedded in the servo band. In this case, information to be embedded may be different for each servo band like the UDIM information or may be common to all servo bands like the LPOS information.

As a method of embedding information in the servo band, a method other than the above-described method can also be employed. For example, a predetermined code may be recorded by thinning out a predetermined pair from the group of pairs of servo stripes.

A head for servo pattern formation is referred to as a servo write head. The servo write head normally has pairs of gaps corresponding to the pairs of magnetic stripes described above by the number of servo bands. Normally, a core and a coil are respectively connected to each of the pairs of gaps, and a magnetic field generated in the core can generate a leakage magnetic field in the pair of gaps by supplying a current pulse to the coil. In forming the servo pattern, the current pulse is input while the magnetic tape is made to run on the servo write head, to transfer a magnetic pattern corresponding to the pair of gaps to the magnetic tape, whereby the servo pattern can be formed. A width of each gap can be appropriately set depending on density of the servo pattern to be formed. The width of each gap can be set to be, for example, equal to or less than 1 μm, 1 to 10 μm, or equal to or greater than 10 μm.

Before forming the servo pattern in the magnetic tape, demagnetization (erasing) processing is normally executed on the magnetic tape. The erasing processing can be executed by applying a uniform magnetic field to the magnetic tape using a direct current magnet or an alternating current magnet. The erasing processing includes direct current (DC) erasing and alternating current (AC) erasing. The AC erasing is performed by gradually decreasing the intensity of the magnetic field while reversing a direction of the magnetic field applied to the magnetic tape. On the other hand, the DC erasing is performed by applying the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing processing may be executed on the entire magnetic tape or may be executed for each servo band of the magnetic tape.

A direction of the magnetic field to the servo pattern to be formed is determined depending on the direction of erasing. For example, in a case where the horizontal DC erasing is performed on the magnetic tape, the formation of the servo pattern is performed such that the direction of the magnetic field is opposite to the direction of erasing. With this, the output of the servo signal that is obtained by reading the servo pattern can be increased. As shown in JP2012-53940A, in a case where the magnetic pattern is transferred to the magnetic tape subjected to the vertical DC erasing using the gap, the servo signal that is obtained by reading the formed servo pattern has a unipolar pulse shape. On the other hand, in a case where the magnetic pattern is transferred to the magnetic tape subjected to the horizontal DC erasing using the gap, the servo signal that is obtained by reading the formed servo pattern has a bipolar pulse shape.

<Magnetic Tape Device>

In the present invention and the present specification, the "magnetic tape device" means a device capable of performing at least one of recording of data on the magnetic tape or reproduction of data recorded on the magnetic tape. Such a device is generally referred to as a drive. The magnetic tape device comprises a magnetic head. The magnetic head is normally accommodated in a housing of the magnetic tape device. The magnetic head can be a recording head capable of performing recording of data on the magnetic tape and can be a reproducing head capable of performing reproduction of data recorded on the magnetic tape. In one embodiment, the magnetic tape device can include both a recording head and a reproducing head as separate magnetic heads. In another embodiment, the magnetic head included in the magnetic tape device may have a configuration in which both a recording element and a reproducing element are provided one magnetic head. As the reproducing head, a magnetic head (MR head) including a magnetoresistive (MR) element capable of reading information recorded on the magnetic tape with excellent sensitivity as a reproducing element is preferably used. As the MR head, various known MR heads (for example, a giant magnetoresistive (GMR) head and a tunnel magnetoresistive (TMR) head, can be used. Alternatively, the magnetic head that performs recording of data and/or reproduction of data may include a servo signal reading element. As a head separate from the magnetic head that performs recording of data and/or reproduction of data, a magnetic head (servo head) comprising a servo signal reading element may be included in the magnetic tape device. For example, the magnetic head (hereinafter, also referred to as a "recording and reproducing head") that performs recording of data and/or reproduction of recorded data can two servo signal reading elements, and the two servo signal reading elements can simultaneously read two adjacent servo bands with the data band interposed therebetween, respectively. One or a plurality of elements for data can be disposed between the two servo signal reading elements. An element (recording element) for recording of data and an element (reproducing element) for reproduction of data are collectively referred to as "elements for data".

In one embodiment, the magnetic tape device can be shipped in a form in which the magnetic tape is incorporated in the housing. In this case, the magnetic tape cartridge is not mounted in the magnetic tape device, and the magnetic tape runs between two reels in the housing of the magnetic tape device. An example of a magnetic tape device of such a form will be described below.

During recording of data and/or reproduction of recorded data, first, head tracking using a servo signal can be performed. That is, a servo signal reading element is made to follow a predetermined servo track, whereby control can be performed such that the element for data passes on a target data track. The movement of the data track is performed by changing the servo track to be read by the servo signal reading element in a tape width direction.

The recording and reproducing head can also perform recording and/or reproduction on other data bands. In this case, the servo signal reading element may be moved to a predetermined servo band using the UDIM information described above, and tracking with respect to the servo band may be started.

Figure 4:
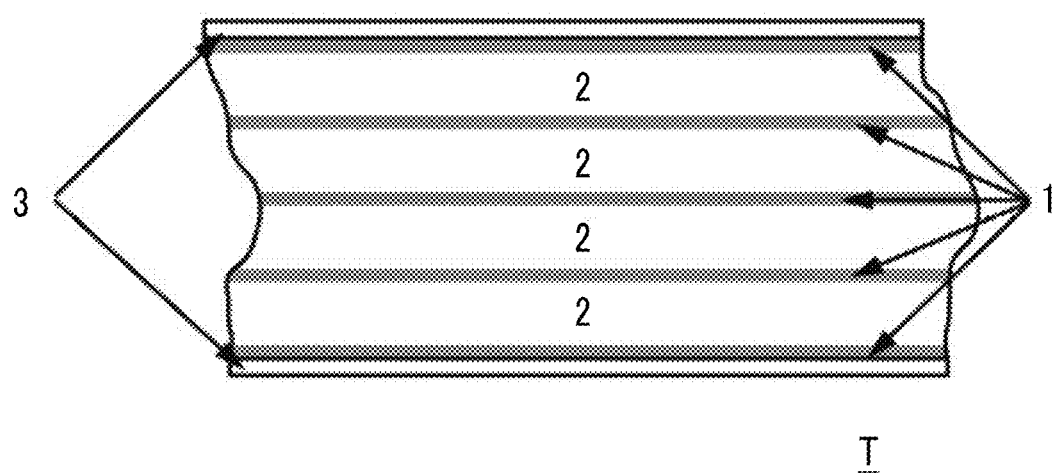
FIG. 4 shows a disposition example of data bands and servo bands.
Figure 5:
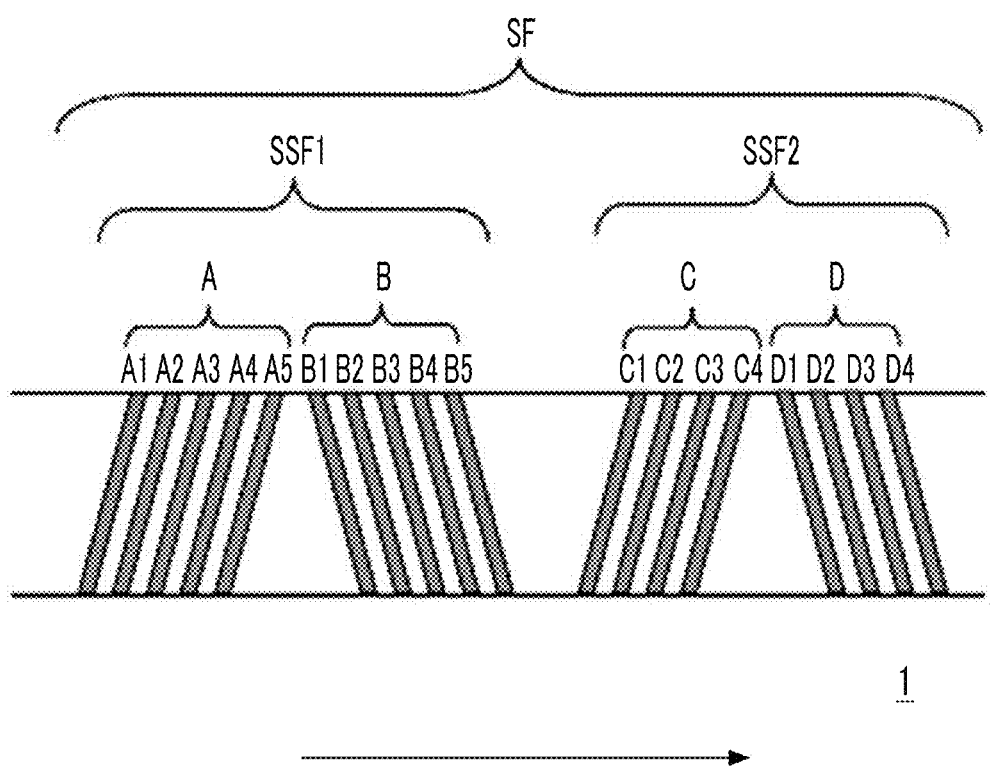
FIG. 5 shows a servo pattern disposition example of a linear tape-open (LTO) Ultrium format tape.

FIG. 4 shows a disposition example of data bands and servo bands. In FIG. 4, a plurality of servo bands 1 are disposed to be interposed between guide bands 3 in a magnetic layer of a magnetic tape T. A plurality of regions 2 interposed between two servo bands are data bands. A servo pattern is a magnetized region and is formed by magnetizing a specific region of the magnetic layer by a servo write head. The region that is magnetized by the servo write head (a position where the servo pattern is formed) is determined by a standard. For example, in an LTO Ultrium format tape that is based on a local standard, during magnetic tape manufacturing, a plurality of servo patterns tilted with respect to the tape width direction as shown in FIG. 5 are formed on a servo band. In detail, in FIG. 5, a servo frame SF on the servo band 1 is configured with a servo sub-frame 1 (SSF1) and a servo sub-frame 2 (SSF2). The servo sub-frame 1 is configured with an A burst (in FIG. 5, reference numeral A) and a B burst (in FIG. 5, reference numeral B). The A burst is configured with servo patterns A1 to A5, and the B burst is configured with servo patterns B1 to B5. On the other hand, the servo sub-frame 2 is configured with a C burst (in FIG. 5, reference numeral C) and a D burst (in FIG. 5, reference numeral D). The C burst is configured with servo patterns C1 to C4, and the D burst is configured with servo patterns D1 to D4. Such 18 servo patterns are disposed in the sub-frames in an arrangement of 5, 5, 4, and 4, as the sets of five servo patterns and four servo patterns, and are used for identifying the servo frames. FIG. 5 shows one servo frame for description. Note that, in practice, in the magnetic layer of the magnetic tape in which head tracking of a timing-based servo system is performed, a plurality of servo frames are disposed in each servo band in a running direction. In FIG. 5, an arrow indicates the running direction. For example, an LTO Ultrium format tape normally has 5000 or more servo frames per a tape length of 1 m in each servo band of the magnetic layer.

<Configuration Example of Magnetic Tape Control System>

Hereinafter, configuration examples of the magnetic tape control system are shown. Note that the present invention is not limited to forms shown in the configuration examples. Pre-rewinding storage can be executed after at least one of recording of data on the magnetic tape or reproduction of data recorded on the magnetic tape is performed, and in an example described below referring to the drawing, pre-rewinding storage is executed after recording of data on the magnetic tape is performed.

(Example where Magnetic Tape is Accommodated in Single Reel Type Magnetic Tape Cartridge in Pre-Rewinding Storage)

Figure 6:
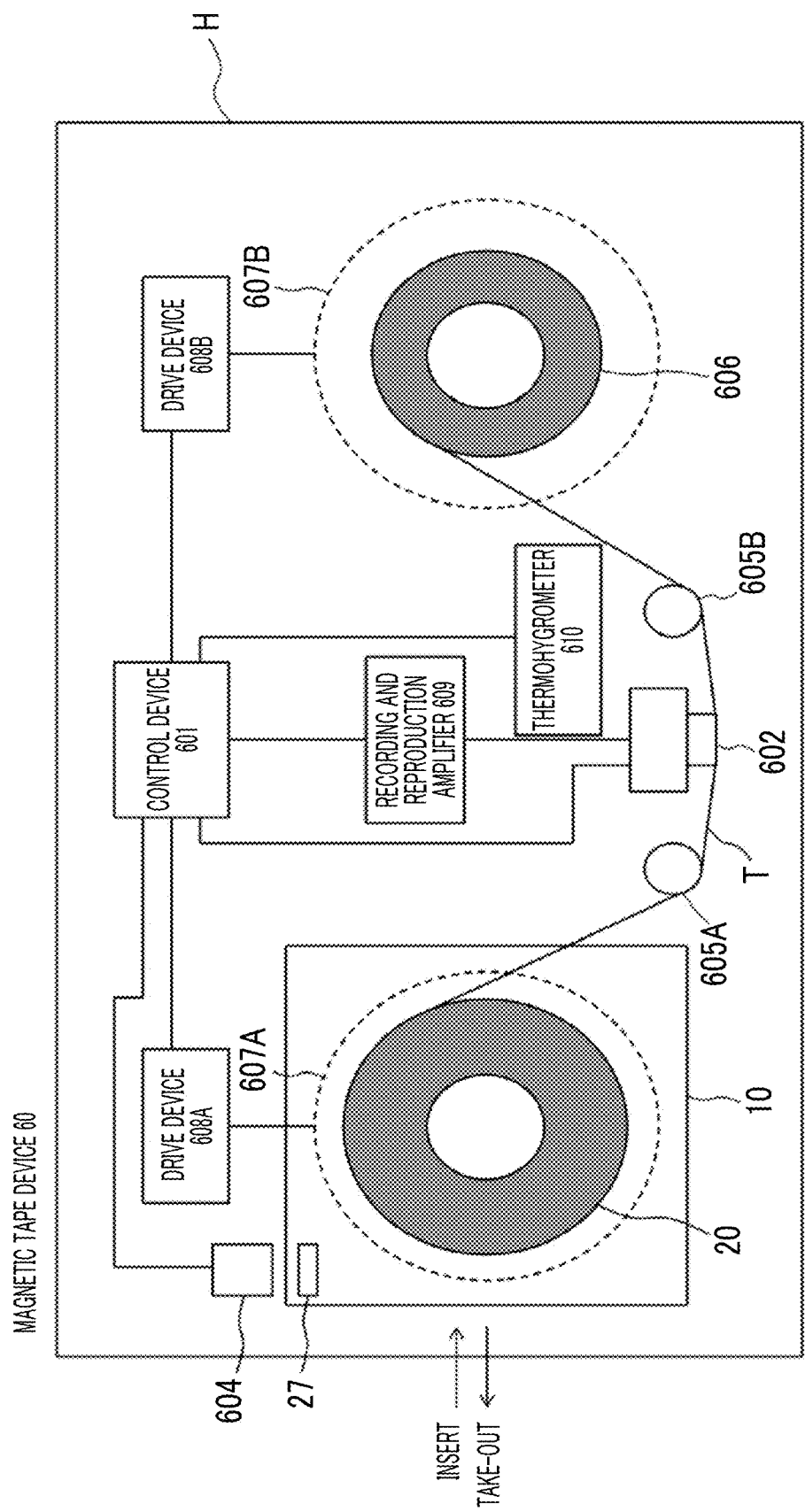
FIG. 6 shows a configuration example of a magnetic tape control system.

FIG. 6 is a diagram showing a configuration example of a magnetic tape control system of a form in which a magnetic tape is accommodated in a single reel type magnetic tape cartridge in pre-rewinding storage.

In the magnetic tape control system shown in FIG. 6, a magnetic tape cartridge 10 is inserted into a housing H of a magnetic tape device 60, and a magnetic tape T is drawn out into the housing H and is wound around a winding reel 606. The housing H can be made of, for example, metal or resin.

In regard to the magnetic tape cartridge 10, the above description regarding the single reel type magnetic tape cartridge can be referred to.

Recording and reproduction of data on the magnetic tape T are performed by controlling a recording and reproducing head unit 602 in response to a command from a control device 601.

The magnetic tape device 60 has a configuration capable of detecting and adjusting tension applied in a longitudinal direction of the magnetic tape from spindle motors 607A and 607B and drive devices 608A and 608B that rotationally control a cartridge reel 20 and a winding reel 606.

The magnetic tape device 60 has a configuration in which the magnetic tape cartridge 10 can be mounted.

The magnetic tape device 60 has a cartridge memory reading and writing device 604 capable of performing reading and writing with respect to a cartridge memory 27 in the magnetic tape cartridge 10.

An end or a leader pin of the magnetic tape T is drawn out from the magnetic tape cartridge 10 inserted into the housing H of the magnetic tape device 60 by an automatic loading mechanism or manually and passes on a recording and reproducing head through guide rollers 605A and 605B in a direction in which a surface of a magnetic layer of the magnetic tape T comes into contact with a surface of the recording and reproducing head of the recording and reproducing head unit 602, and the magnetic tape T is wound around the winding reel 606. In one embodiment, during recording of data on the magnetic tape and/or reproduction of data recorded on the magnetic tape in the magnetic tape device, the magnetic head comes into contact with and slides on the surface of the magnetic layer of the magnetic tape. Such a magnetic tape device is generally referred to as a sliding type drive or a contact sliding type drive. In another embodiment, in the magnetic tape device, the magnetic head performs recording of data on the magnetic tape and/or reproduction of data recorded on the magnetic tape in a noncontact state with the surface of the magnetic layer, except for a case of random contact. A magnetic recording and reproducing device of such a form is generally referred to a floating type drive.

Rotation and torque of the spindle motor 607A and the spindle motor 607B are controlled by a signal from the control device 601, and the magnetic tape T runs at random speed and tension. A servo pattern formed in advance on the magnetic tape can be used to control the tape speed. A tension detection mechanism may be provided between the magnetic tape cartridge 10 and the winding reel 606 to detect tension. Tension can be adjusted using the guide rollers 605A and 605B in addition to the control by the spindle motors 607A and 607B.

The cartridge memory reading and writing device 604 is configured to be able to read out and write information from and to the cartridge memory 27 in response to a command from the control device 601. As a communication system between the cartridge memory reading and writing device 604 and the cartridge memory 27, for example, an International Organization for Standardization (ISO) 14443 system can be employed.

The control device 601 includes, for example, a control unit, a storage unit, and a communication unit.

The recording and reproducing head unit 602 is configured with, for example, a recording and reproducing head, a servo tracking actuator that adjusts a position of the recording and reproducing head in a track width direction, a recording and reproduction amplifier 609, and a connector cable for connection to the control device 601. The recording and reproducing head is configured with, for example, a recording element that records data on the magnetic tape, a reproducing element that reproduces data of the magnetic tape, and a servo signal reading element that reads a servo signal recorded on the magnetic tape. For example, one or more of each of the recording element, the reproducing element, and the servo signal reading element are mounted in one magnetic head. Alternatively, each element may be provided in a plurality of magnetic heads depending on a running direction of the magnetic tape.

The recording and reproducing head unit 602 is configured to be able to record data on the magnetic tape T in response to a command from the control device 601. The recording and reproducing head unit 602 is also configured to be able to reproduce data recorded on the magnetic tape T in response to a command from the control device 601.

The control device 601 has a mechanism that obtains a running position of the magnetic tape from a servo signal read from a servo band during running of the magnetic tape T and performs control such that the servo tracking actuator positions the recording element and/or the reproducing element at a target running position (track position). The control of the track position is performed by, for example, feedback control. The control device 601 has a mechanism that obtains a servo band interval from servo signals read from two adjacent servo bands during running of the magnetic tape T. The control device 601 has a mechanism capable of adjusting and changing tension applied in the longitudinal direction of the magnetic tape by controlling the torque of the spindle motor 607A and the spindle motor 607B and/or the guide rollers 605A and 605B such that the servo band interval is a target value. The adjustment of the tension is performed by, for example, feedback control. The control device 601 can store information regarding the obtained servo band interval in the internal storage unit of the control device 601 disposed in the housing H of the magnetic tape device 60, a storage device (not shown) that is disposed in the housing H as a device separate from the control device, the cartridge memory 27, an external storage device (not shown) that is disposed outside the housing H, and the like.

In the magnetic tape device 60, the tension can be applied in the longitudinal direction of the magnetic tape at one or more timings, such as during recording, during reproduction, during winding on the magnetic tape cartridge, and rewinding around the winding reel 606. The tension applied in the longitudinal direction of the magnetic tape is a constant value in one embodiment and changes in another embodiment. In regard to the tension in the present invention and the present specification, a value of the tension applied in the longitudinal direction of the magnetic tape is a value that is input to the control device to control the mechanism configured to adjust the tension as the tension to be applied in the longitudinal direction of the magnetic tape. For example, as described above, in FIG. 6, a tension detection mechanism can be provided between the magnetic tape cartridge 10 and the winding reel 606 to detect the tension applied in the longitudinal direction of the magnetic tape in practice. In addition, for example, the tension can also be controlled by the control device or the like of the magnetic tape device such that minimum tension falls below a value determined by a standard or a recommended value and/or such that maximum tension exceeds a value determined by a standard or a recommended value. The above-described point also applies to a magnetic tape device and a winding device described below.

Recording of data on the magnetic tape is performed while the magnetic tape T is made to run between the winding reel 606 and the cartridge reel 20. Reproduction of data recorded on the magnetic tape is also performed while the magnetic tape T is made to run between the winding reel 606 and the cartridge reel 20. After the end of recording and/or reproduction, the magnetic tape T is normally wound around the cartridge reel 20 of the magnetic tape cartridge 10, and the total length of the magnetic tape T is accommodated in the magnetic tape cartridge 10. The magnetic tape cartridge 10 in which the magnetic tape T is accommodated is held in the housing H of the magnetic tape device 60 in one embodiment, and is extracted from the housing H in another embodiment.

In the example shown in FIG. 6, the magnetic tape T is stored in a state of being wound around the cartridge reel 20 of the magnetic tape cartridge 10 in this manner. Such storage is pre-rewinding storage.

After pre-rewinding storage, in a case where the magnetic tape cartridge 10 is extracted from the housing H of the magnetic tape device 60, the magnetic tape cartridge 10 is inserted into the housing H again, and a part or the total length of the magnetic tape T is wound (that is, rewound) around the winding reel 606 of the magnetic tape device 60. A tape end that is a tape outside end in a state of being wound around the cartridge reel 20 is turned into an end of a starting point of winding in winding (rewinding) around the winding reel 606 of the magnetic tape device 60. Accordingly, in the magnetic tape T after rewinding, an end that is a tape outside end with respect to the cartridge reel 20 during storage in a state of being wound around the cartridge reel 20 is turned into a tape inside end with respect to the winding reel 606, and an end that is a tape inside end with respect to the cartridge reel 20 during storage in a state of being wound around the cartridge reel 20 is turned into a tape outside end with respect to the winding reel 606. From a viewpoint of easily starting reproduction and/or recording of data after post-rewinding storage described below, a portion that is wound around the winding reel 606 by rewinding is preferably is a part of the magnetic tape T. In this case, in the magnetic tape T, a portion (as an example, a length of about 10 m) including the end as the tape outside end with respect to the winding reel 606 is preferably on the cartridge reel 20 or wound around the cartridge reel 20 from a viewpoint of more easily starting reproduction and/or recording of data after post-rewinding storage.

The magnetic tape T is stored in the housing H of the magnetic tape device 60 in a state of being rewound around the winding reel 606 in this manner. Such storage is post-rewinding storage. A temperature and humidity in the housing H of the magnetic tape device 60 as a storage environment of the magnetic tape during post-rewinding storage can be measured and monitored by a thermohygrometer 610.

After post-rewinding storage, the magnetic tape T is made to run between the winding reel 606 and the cartridge reel 20, whereby reproduction of data recorded on the magnetic tape T and/or recording of data on the magnetic tape can be performed.

In the example shown in FIG. 6, out of the reel around which the magnetic tape is wound by rewinding and the reel around which the magnetic tape is wound before rewinding, one reel is the cartridge reel of the magnetic tape cartridge, the other reel is the reel around which the magnetic tape is wound during recording and reproduction, and the other reel is the winding reel that is provided in the magnetic tape device comprising the magnetic head (in detail, in the housing in which the magnetic head is accommodated).

Figure 7:
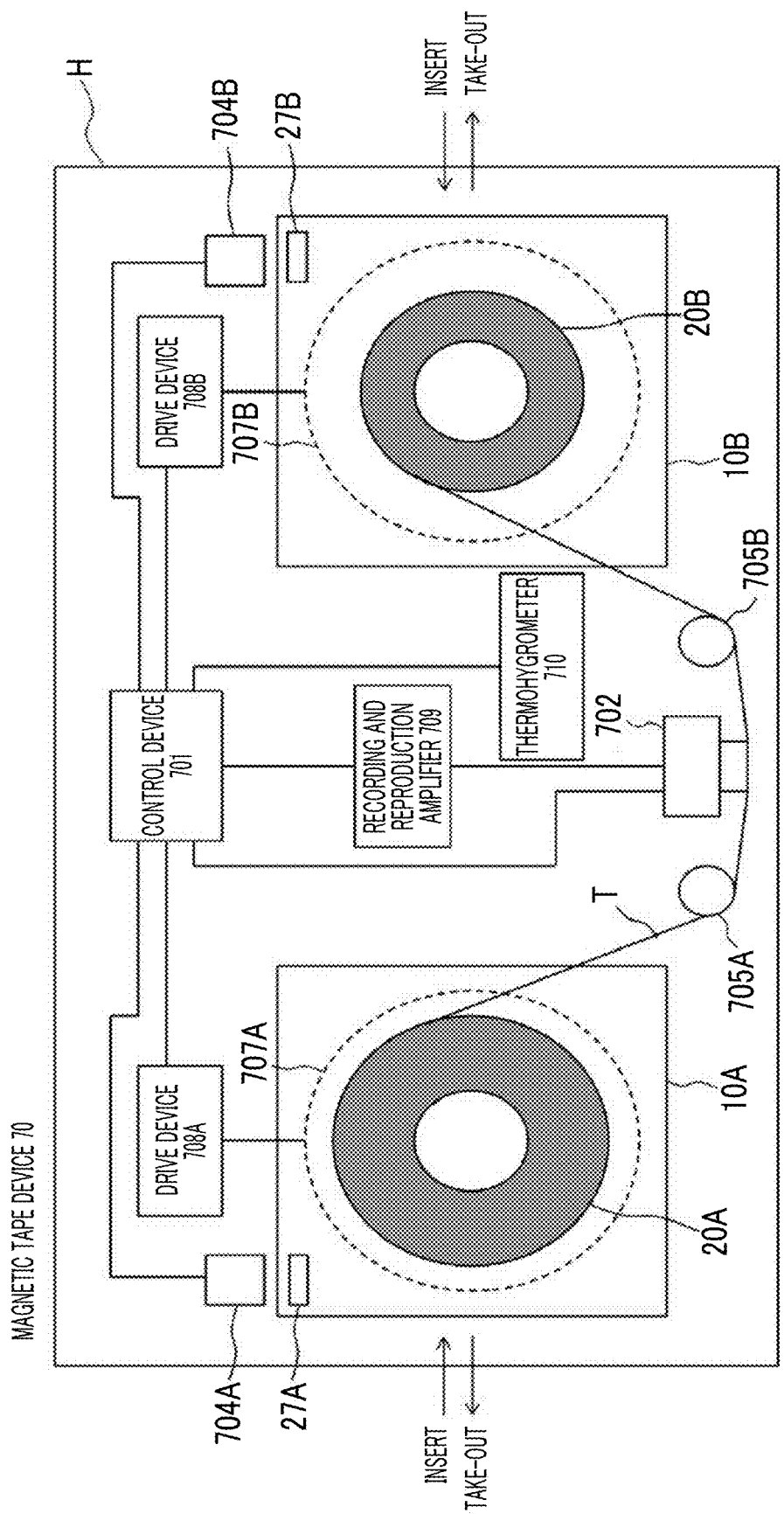
FIG. 7 shows another configuration example of a magnetic tape control system.

FIG. 7 shows another configuration example of a magnetic tape control system. In regard to each of a housing H, a control device 701, a recording and reproducing head unit 702, cartridge memory reading and writing devices 704A and 704B, guide rollers 705A and 705B, spindle motors 707A and 707B, drive devices 708A and 708B, a recording and reproduction amplifier 709, and a thermohygrometer 710 in FIG. 7, the above description on each unit of FIG. 6 can be referred to. In regard to each of magnetic tape cartridges 10A and 10B, cartridge reels 20A and 20B, and cartridge memories 27A and 27B, the above description on each unit of FIGS. 1 to 3, and 6 can be referred to.

In the example shown in FIG. 7, out of the reel around which the magnetic tape is wound by rewinding and the reel around which the magnetic tape is wound before rewinding, one reel is a cartridge reel of a magnetic tape cartridge, and the other reel is a cartridge reel of a magnetic tape cartridge different from the magnetic tape cartridge having one cartridge reel described above. In detail, in the example shown in FIG. 7, a magnetic tape device 70 comprising a magnetic head is designed such that two magnetic tape cartridges 10A and 10B can be attached and detached. In the magnetic tape cartridge 10A, the magnetic tape T on which recording of data and/or reproduction of data is performed in the housing H of the magnetic tape device 70 is accommodated. The other magnetic tape cartridge 10B is in an empty state in which the magnetic tape is not wound, and the magnetic tape T can be wound. Hereinafter, the magnetic tape cartridge 10B is referred to as a cartridge for winding, and the cartridge reel 20B of the magnetic tape cartridge 10B is referred to as a cartridge reel for winding. During a recording and reproducing operation, the cartridge reel 20B for winding is handled in the same manner as the winding reel provided in the housing of the magnetic tape device of FIG. 6, whereby recording and reproduction can be performed. That is, recording of data on the magnetic tape is performed while the magnetic tape T is made to run between the cartridge reel 20B for winding and the cartridge reel 20A. Reproduction of data recorded on the magnetic tape is also performed while the magnetic tape T is made to run between the cartridge reel 20B for winding and the cartridge reel 20A. After the end of recording and/or reproduction, the magnetic tape T is normally wound around the cartridge reel 20A of the magnetic tape cartridge 10A, and the total length of the magnetic tape T is accommodated in the magnetic tape cartridge 10A. The magnetic tape cartridge 10A in which the magnetic tape T is accommodated is extracted from the housing H of the magnetic tape device 70 in one embodiment, and is held in the housing H in another embodiment.

In the example shown in FIG. 7, the magnetic tape T is stored in a state of being wound around the cartridge reel 20A of the magnetic tape cartridge 10A in this manner. Such storage is pre-rewinding storage.

After pre-rewinding storage, in a case where the magnetic tape cartridge 10A is extracted from the magnetic tape device 70, the magnetic tape cartridge 10A is inserted into the housing H of the magnetic tape device 70 again, and the total length of the magnetic tape T is wound (that is, rewound) around the cartridge reel 20B for winding. A tape end that is a tape outside end in a state of being wound around the cartridge reel 20A is turned into an end of a starting point of winding in winding (rewinding) around the cartridge reel 20B for winding. Accordingly, in the magnetic tape T after rewinding, an end that is a tape outside end with respect to the cartridge reel 20A during storage in a state of being wound around the cartridge reel 20A is turned into a tape inside end with respect to the cartridge reel 20B for winding, and an end that is a tape inside end with respect to the cartridge reel 20A during storage in a state of being wound around the cartridge reel 20A is turned into a tape outside end with respect to the cartridge reel 20B for winding. The magnetic tape T is stored in the cartridge 10B for winding in a state of being rewound around the cartridge reel 20B for winding in this manner. In one embodiment, post-rewinding storage can be performed by extracting the cartridge 10B for winding from the housing H of the magnetic tape device 70 and placing the cartridge 10B for winding, in which the magnetic tape T is accommodated, under the storage environment. In another embodiment, post-rewinding storage can be performed while the cartridge 10B for winding in which the magnetic tape T is accommodated is held in the housing H of the magnetic tape device 70.

In a case where the cartridge 10B for winding in which the magnetic tape T is accommodated is extracted from the housing H of the magnetic tape device 70, after post-rewinding storage, the cartridge 10B for winding is inserted into the housing H of the magnetic tape device 70 again. In one embodiment, after the magnetic tape T is unwound from the cartridge 10B for winding to the cartridge reel 20A, the magnetic tape T is made to run between the cartridge reel 20A and the cartridge reel 20B for winding, and reproduction of data recorded on the magnetic tape T and/or recording of data on the magnetic tape can be performed. In one embodiment, after the cartridge 10B for winding is inserted into the housing H of the magnetic tape device 70 again after post-rewinding storage, the magnetic tape T is made to run between the cartridge reel 20B for winding and the cartridge reel 20A without performing unwinding to the magnetic tape cartridge 10A, and reproduction of data recorded on the magnetic tape T and/or recording of data on the magnetic tape can be performed. In the present embodiment, since the magnetic tape is made to run in a direction opposite to running before pre-rewinding storage, a tape running system can be designed such that signal processing and the like of a servo track following data signal can be performed even though the magnetic tape is made to run in this way. In another embodiment, after post-rewinding storage, the cartridge 10B for winding is inserted as the magnetic tape cartridge 10 into the housing H of the magnetic tape device 60 shown in FIG. 6, the magnetic tape T is made to run between the cartridge reel 20B for winding (in FIG. 6, the cartridge reel 20) and the winding reel 606, and reproduction of data recorded on the magnetic tape T and/or recording of data on the magnetic tape can be performed. In the present embodiment, since the magnetic tape is made to run in a direction opposite to running before pre-rewinding storage, a tape running system can be designed as described above.

(Example where Magnetic Tape is Accommodated in Twin Reel Type Magnetic Tape Cartridge in Pre-Rewinding Storage)

Figure 8:
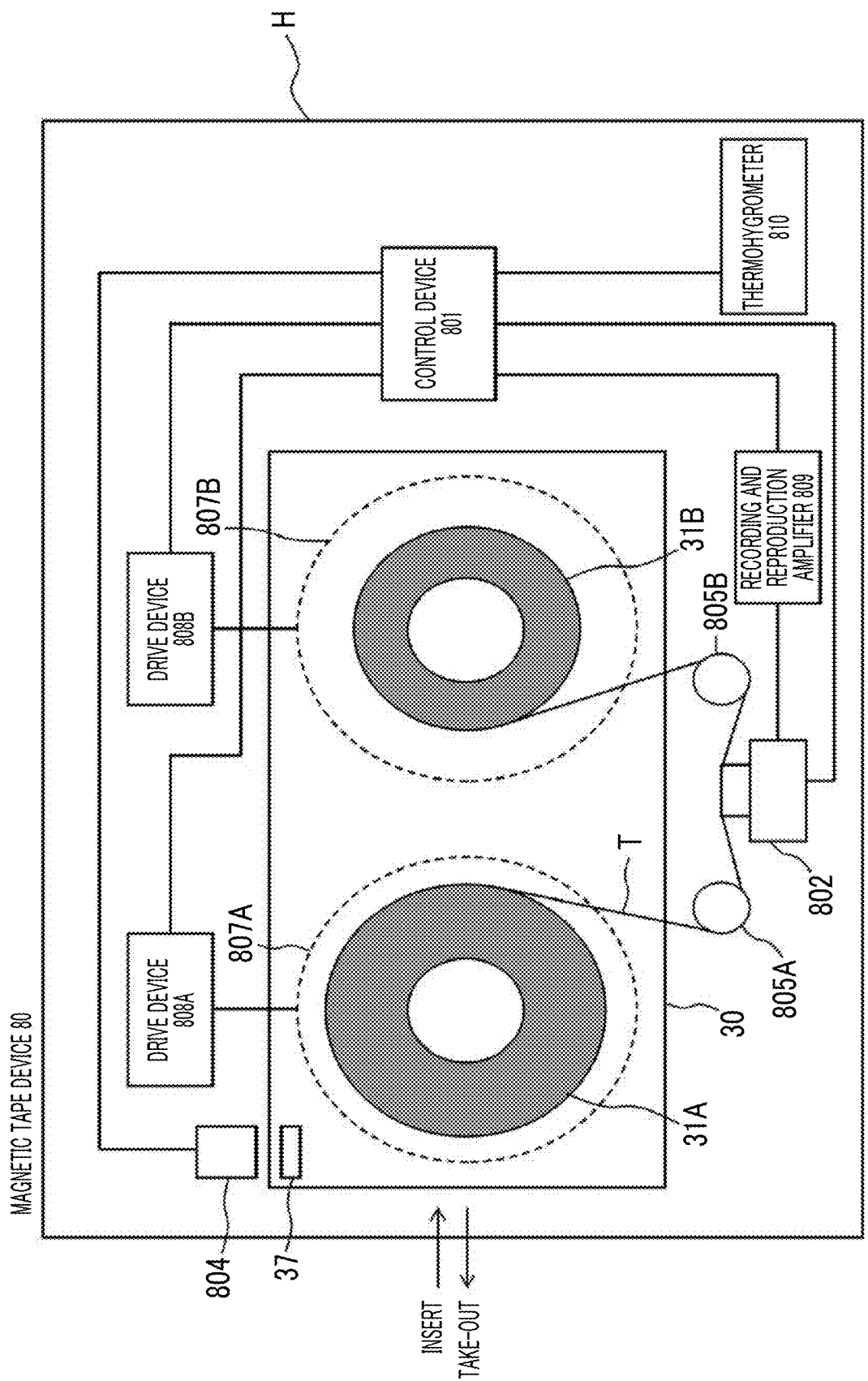
FIG. 8 shows another configuration example of a magnetic tape control system.

FIG. 8 shows an example where a twin reel type magnetic tape cartridge 30 and a magnetic tape device 80 designed such that the magnetic tape cartridge can be attached and detached are used. Normally, the magnetic tape cartridge 30 is inserted into the magnetic tape device 80 in a state in which a majority or the total length of the magnetic tape T is wound around any one cartridge reel out of two cartridge reels 31A and 31B. In the magnetic tape, in regard to the term "majority", the tape length is preferably equal to or greater than 80%, more preferably equal to or greater than 90%, and still more preferably equal to or greater than 95%, of the data recording region of the magnetic tape. Recording of data on the magnetic tape is performed while the magnetic tape T is made to run between the cartridge reels 31A and 31B. Reproduction of data recorded on the magnetic tape is also performed while the magnetic tape T is made to run between the cartridge reels 31A and 31B. After the end of recording and/or reproduction, a part or the total length of the magnetic tape T is wound around one of the two cartridge reels. Thereafter, the magnetic tape cartridge 30 is extracted from the housing H of the magnetic tape device 80 in one embodiment, and is held in the housing H in another embodiment.

In the example shown in FIG. 8, the magnetic tape T is stored in a state in which a part or the total length thereof is wound around one of the two cartridge reels of the magnetic tape cartridge 30. Such storage is pre-rewinding storage. From a viewpoint of easily starting rewinding, a portion wound around one cartridge reel in pre-rewinding storage is preferably a part of the magnetic tape T.

After pre-rewinding storage, in a case where the magnetic tape cartridge 30 is extracted from the housing H of the magnetic tape device 80, the magnetic tape cartridge 30 is inserted into the housing H of the magnetic tape device 80, and a part or the total length of the magnetic tape T is wound (that is, rewound) around the other cartridge reel from one cartridge reel. A tape end that is a tape outside end with respect to one cartridge reel in a state of being wound around one cartridge reel is turned into an end of a starting point of winding in winding (rewinding) around the other cartridge reel. Accordingly, in the magnetic tape T after rewinding, an end that is a tape outside end with respect to one cartridge reel during storage in a state of being wound around one cartridge reel is turned into a tape inside end with respect to the other cartridge reel, and an end that is a tape inside end with respect to one cartridge reel during storage in a state of being wound around one cartridge reel is turned into a tape outside end with respect to the other cartridge reel. The magnetic tape T is stored in the magnetic tape cartridge 30 in a state of being rewound around the other cartridge reel in this manner. From a viewpoint of easily starting reproduction and/or recording of data after post-rewinding storage, a portion that is wound around the cartridge reel 31A or 31B by rewinding is preferably a part of the magnetic tape T. In this case, in the magnetic tape T, a portion (as an example, a length of about 10 m) including an end as a tape outside end with respect to the cartridge reel around which the magnetic tape T is wound in post-rewinding storage is preferably on the other cartridge reel or wound around the cartridge reel from a viewpoint of more easily starting reproduction and/or recording of data after post-rewinding storage. In one embodiment, post-rewinding storage can be performed by extracting the magnetic tape cartridge 30 from the magnetic tape device 80 and placing the magnetic tape cartridge 30 in which the magnetic tape T is accommodated, under the storage environment. In another embodiment, post-rewinding storage can be performed while the magnetic tape cartridge 30 in which the magnetic tape T is accommodated is held in the magnetic tape device 80.

In a case where the magnetic tape cartridge 30 in which the magnetic tape T is accommodated is extracted from the housing H of the magnetic tape device 80, after post-rewinding storage, the magnetic tape cartridge 30 is inserted into the housing H of the magnetic tape device 80 again. In one embodiment, after a part or the total length of the magnetic tape T is unwound from the cartridge reel around which the magnetic tape T is wound after post-rewinding storage, to the cartridge reel, the magnetic tape T is made to run between the cartridge reels 31A and 31B, and reproduction of data recorded on the magnetic tape T and/or recording of data on the magnetic tape can be performed. In one embodiment, after post-rewinding storage, the magnetic tape T is made to run between the cartridge reels 31A and 31B without performing unwinding described above, reproduction of data recorded on the magnetic tape T and/or recording of data on the magnetic tape can be performed.

In regard to each of the housing H, a control device 801, a recording and reproducing head unit 802, a cartridge memory reading and writing device 804, guide rollers 805A and 805B, spindle motors 807A and 807B, drive devices 808A and 808B, a recording and reproduction amplifier 809, and a thermohygrometer 810 in FIG. 8, the above description on each unit of FIG. 6 can be referred to. In regard to each of the cartridge reels 31A and 31B and a cartridge memory 37, the above description on each unit of FIGS. 2, 3, and 6 can be referred to. In regard to the magnetic tape cartridge 30, a known technique and the above description regarding a twin reel type magnetic tape cartridge can be referred to.

(Example where Magnetic Tape is Wound Around Reel in Magnetic Tape Device in Pre-Rewinding Storage)

In the above-described example, the magnetic tape is handled as a removable medium (so-called replaceable medium), the magnetic tape cartridge in which the magnetic tape is accommodated can be inserted into the housing of the magnetic tape device, and the magnetic tape cartridge in which the magnetic tape is accommodated can be extracted from the housing of the magnetic tape device. Note that such an embodiment is one embodiment, and in another embodiment, the magnetic tape is not handled as a replaceable medium, the magnetic tape is accommodated in the magnetic tape device comprising the magnetic head (in detail, in the housing in which the magnetic head is accommodated).

In the present embodiment, both the reel around which the magnetic tape is wound during pre-rewinding storage and the reel around which the magnetic tape is wound by rewinding are reels that are provided in the magnetic tape device comprising the magnetic head (in detail, in the housing in which the magnetic head is accommodated).

Figure 9:
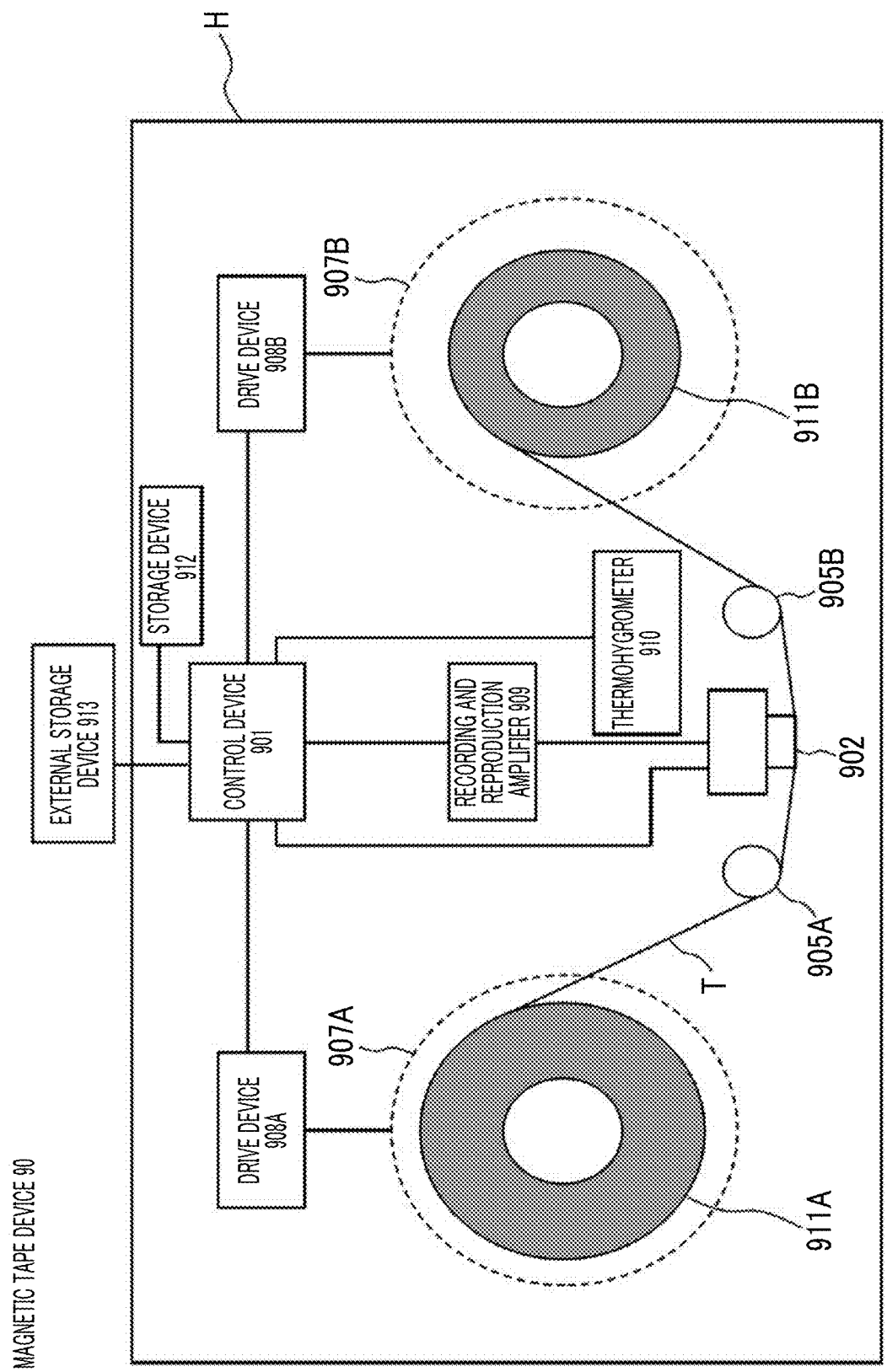
FIG. 9 shows another configuration example of a magnetic tape control system.

FIG. 9 shows an example where a reel around which a magnetic tape is wound and a magnetic tape device are integrated, as an example of the above-described embodiment. In FIG. 9, a tape reel 911A and a tape reel 911B are fixed in a housing H of a magnetic tape device 90, and the magnetic tape T is not handled as a replaceable medium. Recording of data on the magnetic tape is performed while the magnetic tape T is made to run between the tape reels 911A and 911B. Reproduction of data recorded on the magnetic tape is also performed while the magnetic tape T is made to run between the tape reels 911A and 911B. After the end of recording and/or reproduction, the magnetic tape T is normally stored in the magnetic tape device 90 in a state in which a majority thereof is wound around the tape reel 911A or the tape reel 911B. Such storage is pre-rewinding storage. After pre-rewinding storage, winding (rewinding) around the other tape reel is performed, and the magnetic tape T is stored in the magnetic tape device 90 in a state in which a majority of the magnetic tape T is wound around the other tape reel. Such storage is post-rewinding storage. A tape end that is a tape outside end with respect to one tape reel in a state of being wound around one tape reel is turned into an end of a starting point of winding around the other tape reel in winding (rewinding) around the other tape reel. Accordingly, the magnetic tape T after rewinding is wound around the other tape reel such that an end that is a tape outside end with respect to one tape reel during storage in a state of being wound around one tape reel is turned into a tape inside end with respect to the other tape reel, and an end that is a tape inside end with respect to one tape reel during storage in a state of being wound around one tape reel is turned into a tape outside end with respect to the other tape reel. The magnetic tape T is stored in the housing H of the magnetic tape device 90 in a state of being rewound around the other tape reel in this manner.

In one embodiment, after the magnetic tape T is unwound from the tape reel around which the magnetic tape T is wound, to the other tape reel after post-rewinding storage, the magnetic tape T is made to run between the tape reels 911A and 911B, and reproduction of data recorded on the magnetic tape T and/or recording of data on the magnetic tape can be performed. In one embodiment, after post-rewinding storage, the magnetic tape T is made to run between the tape reels 911A and 911B without performing unwinding described above, and reproduction of data recorded on the magnetic tape T and/or recording of data on the magnetic tape can be performed.

In regard to each of the housing H, a control device 901, a recording and reproducing head unit 902, guide rollers 905A and 905B, spindle motors 907A and 907B, drive devices 908A and 908B, a recording and reproduction amplifier 909, and a thermohygrometer 910 in FIG. 9, the above description on each unit of FIG. 6 can be referred to. In regard to each of the tape reels 911A and 911B, the above description on each unit of FIGS. 2, 3, and 6 can be referred to.

The magnetic tape device 90 has a storage device 912 that is accommodated in the housing H, and an external storage device 913 that is disposed outside the housing H. The storage devices will be described below.

(Example where Magnetic Tape is Wound Around Winding Reel in Winding Device in Post-Rewinding Storage)

In the examples shown in FIGS. 6 to 9, winding of the magnetic tape is performed in the magnetic tape device comprising the magnetic head. As another embodiment, rewinding of a magnetic tape can be performed using a winding-dedicated device not including a magnetic head.

Figure 10:
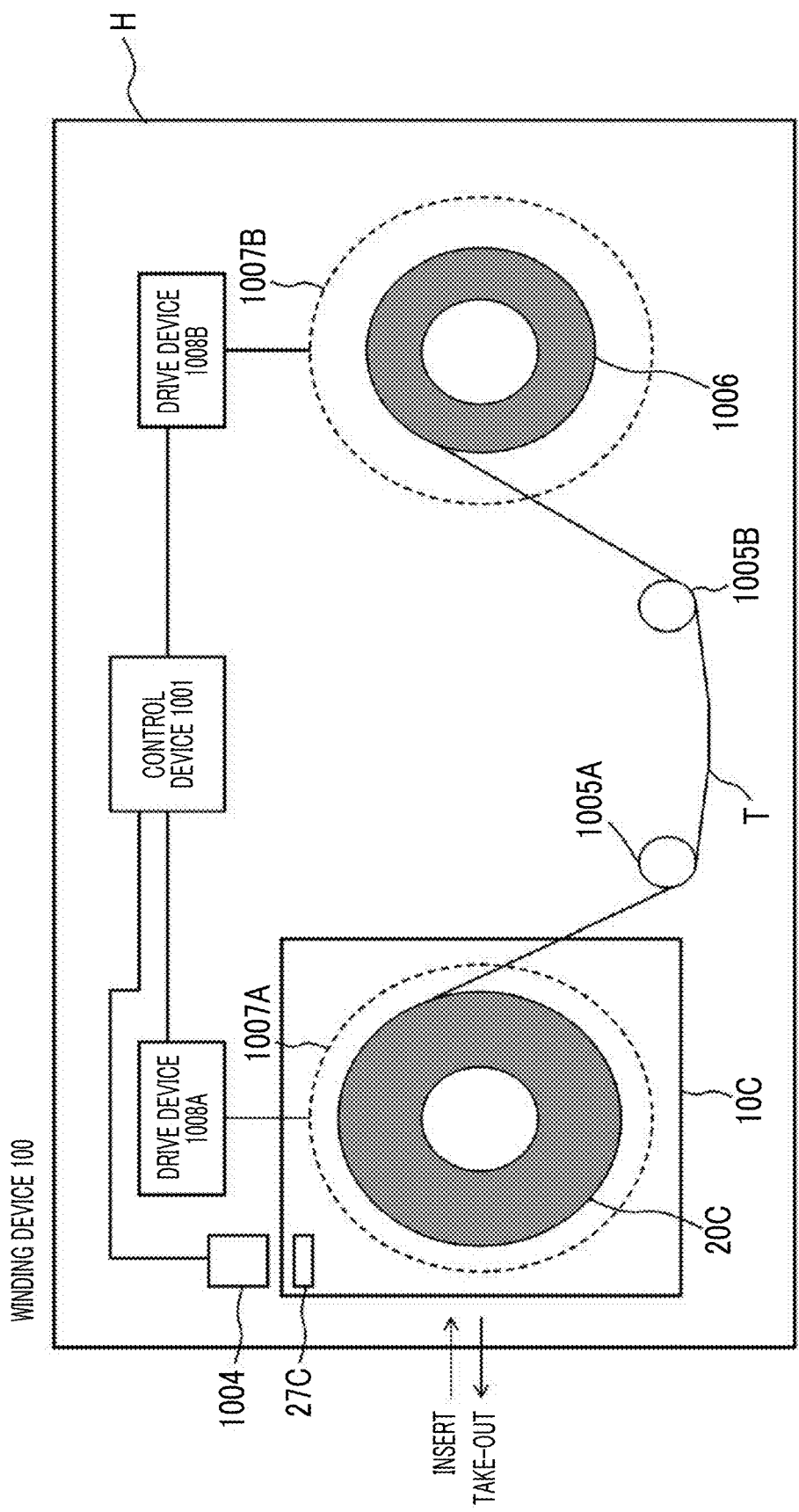
FIG. 10 shows another configuration example of a magnetic tape control system.

FIG. 10 shows an example where, out of a reel around which a magnetic tape is wound during pre-rewinding storage and a reel around which the magnetic tape is wound during post-rewinding storage, one reel is a cartridge reel of a magnetic tape cartridge, and the other reel is a winding reel that is provided in a winding device. In the example shown in FIG. 10, the reel around which the magnetic tape is wound during pre-rewinding storage is the cartridge reel of the magnetic tape cartridge, and the reel around which rewinding is performed and the magnetic tape is wound is the winding reel in the winding device.

In regard to the example shown in FIG. 10, the description until pre-rewinding storage is the same as the description on the example shown in FIG. 6.

In the example shown in FIG. 10, to perform rewinding, a magnetic tape cartridge 10C is inserted into a housing H of a winding device 100. A magnetic head is not accommodated in the housing H. In the housing H of the winding device 100, the total length of the magnetic tape T is wound (that is, rewound) around a winding reel 1006 of the winding device 100. A tape end that is a tape outside end in a state of being wound around a cartridge reel 20C is turned into an end of a starting point of winding in winding (rewinding) around the winding reel 1006 of the winding device 100. Accordingly, in the magnetic tape T after rewinding, an end that is a tape outside end with respect to the cartridge reel 20C during storage in a state of being wound around the cartridge reel 20C is turned into a tape inside end with respect to the winding reel 1006, and an end that is a tape inside end with respect to the cartridge reel 20C during storage in a state of being wound around the cartridge reel 20C is turned into a tape outside end with respect to the winding reel 1006. The magnetic tape T is stored in the housing H of the winding device 100 in a state of being rewound around the winding reel 1006 in this manner. Such storage is post-rewinding storage. A portion that is wound around the winding reel 1006 by rewinding is a part or the total length of the magnetic tape T, and is preferably a part of the magnetic tape T from a viewpoint of easiness in accommodating the magnetic tape T in the magnetic tape cartridge 10C after post-rewinding storage. In a case where a part of the magnetic tape T is wound around the winding reel 1006 by rewinding, in the magnetic tape T, a portion (as an example, a length of about 10 m) including an end as a tape outside end with respect to the winding reel 1006 is preferably on the cartridge reel 20C or wound around the cartridge reel 20C from a viewpoint of more easily accommodating.

After post-rewinding storage, in the housing H of the winding device 100, the total length of the magnetic tape T is wound around the cartridge reel 20C of the magnetic tape cartridge 10C again and is accommodated in the magnetic tape cartridge 10C. The magnetic tape cartridge 10C in which the magnetic tape T is accommodated in this manner is inserted into, for example, the magnetic tape device 60 shown in FIG. 6, and reproduction of data recorded on the magnetic tape T and/or recording of data on the magnetic tape can be performed.

In regard to each of the housing H, a control device 1001, a cartridge memory reading and writing device 1004, guide rollers 1005A and 1005B, spindle motors 1007A and 1007B, and drive devices 1008A and 1008B in FIG. 10, the above description on each unit of FIG. 6 can be referred to. In regard to each of the magnetic tape cartridge 10C, the cartridge reel 20C, a cartridge memory 27C, and the winding reel 1006, the above description on each unit of FIGS. 1 to 3, and 6 can be referred to.

Figure 11:
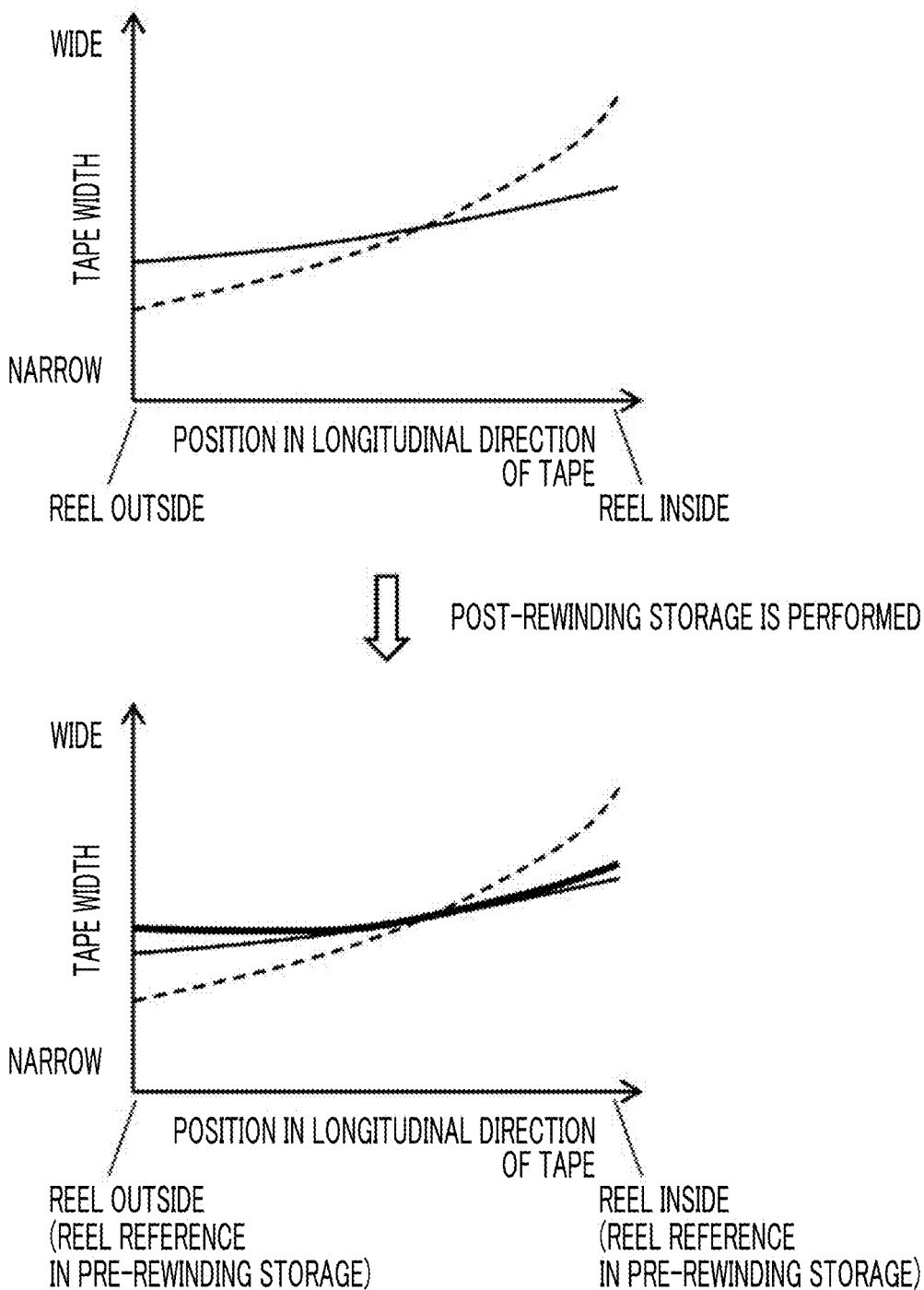
FIG. 11 shows an example where tape width deformation of a magnetic tape caused by pre-rewinding storage is restored by performing post-rewinding storage.

FIG. 11 shows an example where tape width deformation of a magnetic tape caused by pre-rewinding storage is restored by performing post-rewinding storage.

An upper view of FIG. 11 shows that, after pre-rewinding storage, a tape width of the magnetic tape is changed from a tape width before pre-rewinding storage (that is, is deformed). The tape width (a dotted line in FIG. 11) after pre-rewinding storage is different from the tape width (a fine solid line in FIG. 11) before pre-rewinding storage. In a case where a tape width difference before and after storage is large, a phenomenon of recording failure (for example, overwriting of recorded data), reproduction failure (for example, reading failure of data), or the like occurs after storage.

In contrast, as shown in a lower view of FIG. 11, the tape width (a thick solid line in FIG. 11) of the magnetic tape after post-rewinding storage is close to the tape width before pre-rewinding storage. That is, post-rewinding storage is executed, whereby the tape width difference of the magnetic tape before and after storage is reduced. This is considered to be a result of during post-rewinding storage, causing creep deformation in a direction opposite to during pre-rewinding storage with rewinding. In FIG. 11, a reel inside refers to a position that is an inside (a side close to the reel) in a state in which the magnetic tape is wound around the reel during pre-rewinding storage, and a reel outside refers to a position that is an outside (a side far from the reel) in a state in which the magnetic tape is wound around the reel during pre-rewinding storage.

In the example shown in the drawing, post-rewinding storage is performed by winding the magnetic tape around the reel different from the reel around which the magnetic tape is wound in pre-rewinding storage. In another embodiment, post-rewinding storage can be performed by winding the magnetic tape around the same reel as the reel around which the magnetic tape is wound in pre-rewinding storage.

In regard to rewinding described above, an execution time of post-rewinding storage can be determined based on a measurement result regarding the tape width of the magnetic tape subjected to pre-rewinding storage. In one embodiment, the execution time of post-rewinding storage can be determined based on a comparison result of comparing the measurement result regarding the tape width of the magnetic tape subjected to pre-rewinding storage with a measurement result regarding a tape width of the magnetic tape before being subjected to pre-rewinding storage. For such comparison, the measurement result regarding the tape width of the magnetic tape before being subjected to pre-rewinding storage (for example, the magnetic tape after recording or reproduction of data) is preferably stored in a data storage region of the magnetic tape control system. The measurement result stored in this manner is read out and is compared with the measurement result regarding the tape width of the magnetic tape subjected to pre-rewinding storage, and in a case where the tape width difference exceeds a threshold value, rewinding can be executed to perform post-rewinding storage. For example, a preliminary experiment is performed, whereby a tape width difference capable of suppressing a phenomenon of recording failure or reproduction failure after storage can be determined as the threshold value.

The data storage region can be a partial region of the above-described magnetic tape in one embodiment.

In one embodiment, the data storage region can be a storage medium different from the magnetic tape, and can be, for example, the cartridge memory of the magnetic tape cartridge or an information holding region that is included in the magnetic tape device. As the data storage region, one or two or more storage mediums can be used.

For example, the data holding region that is included in the magnetic tape device can be a storage medium that is included in the storage unit in the control device (for example, the control device shown in various drawings described above, such as the control device 601 in FIG. 6) disposed in the housing of the magnetic tape device, a storage device (for example, the storage device 912 in FIG. 9) disposed as a device separate from the control device in the housing of the magnetic tape device, an external storage device (for example, the external storage device 913 in FIG. 9) disposed outside the housing of the magnetic tape device, or the like.

The magnetic tape control system can have a rewinding control unit that transmits rewinding execution information, and a drive unit that receives the rewinding execution information and starts running of the magnetic tape to execute the rewinding. The rewinding control unit can be included in, for example, the control device (for example, the control device 601 in FIG. 6) shown in various drawings described above. The drive unit can be included in, for example, the drive device (for example, the drive devices 608A and 608B in FIG. 6) shown in various drawings described above.

The rewinding control unit can determine the execution time of post-rewinding storage based on the measurement result regarding the tape width of the magnetic tape subjected to pre-rewinding storage. In one embodiment, the rewinding control unit can determine the execution time of post-rewinding storage based on the comparison result of comparing the measurement result regarding the tape width of the magnetic tape subjected to pre-rewinding storage with the measurement result regarding the tape width of the magnetic tape before being subjected to the pre-rewinding storage. For such comparison, the rewinding control unit can read out the measurement result regarding the tape width of the magnetic tape subjected to pre-rewinding storage, from the data storage region where the measurement result is stored.

<Rewinding Execution Flow Example>

Figure 12:
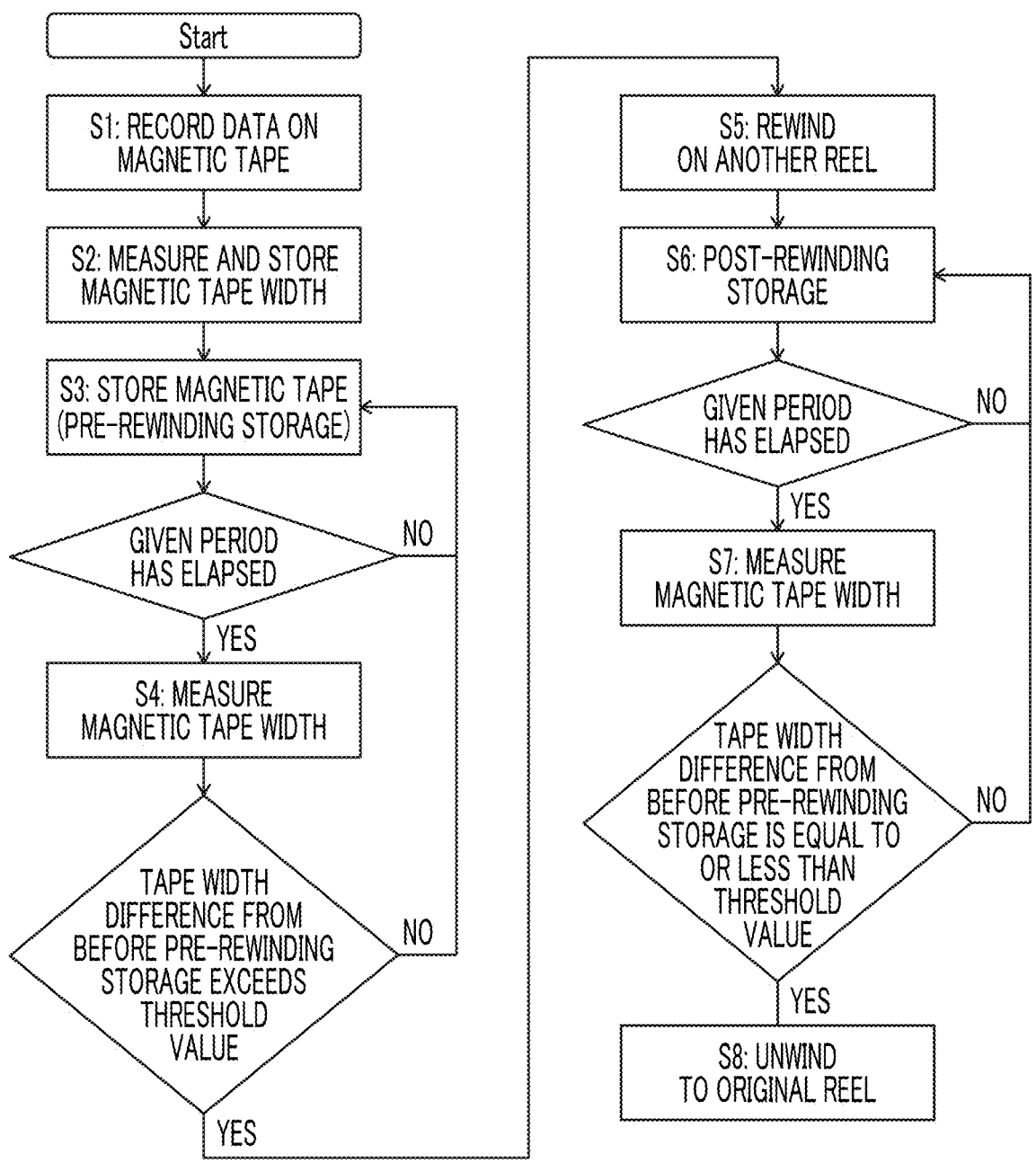
FIG. 12 shows a rewinding execution flow example.

FIG. 12 shows a rewinding execution flow example.

After recording (S1) of data on the magnetic tape is performed, simultaneously with recording or at a timing at which the tape width is regarded to be equal to the tape width during recording, the measurement of the magnetic tape width and the storage of the measurement result are performed (S2). The storage region of the measurement result is as described above.

The measurement result regarding the magnetic tape width can be, for example, a measured value obtained by measuring the tape width of the magnetic tape using a laser displacement meter (for example, KEYENCE LS-9030 manufactured by KEYENCE CORPORATION). Alternatively, the interval of two adjacent servo bands with the data band interposed therebetween may be measured using the servo signal on the magnetic tape and the servo signal reading element, and the measurement result may be employed as the measurement result regarding the tape width of the magnetic tape. Since the width of the magnetic tape can be different depending on the position in the longitudinal direction of the tape, a value of a constant interval in the longitudinal direction is preferably measured and stored. In a case where recording is performed while being divided into a plurality of times, since the magnetic tape width can be different at each timing, the magnetic tape width at each timing is preferably stored. Since the width of the magnetic tape may be influenced by the hygrothermal environment and the tension applied in the tape longitudinal direction during winding, the threshold value described above is preferably determined in consideration of such an influence.

The tension (hereinafter, also referred to as "winding tension") applied in the longitudinal direction of the magnetic tape during winding around the reel is preferably determined in consideration of suppression of the occurrence of a winding abnormality, the influence on tape running stability, and the like. From such a viewpoint, the winding tension is preferably equal to or greater than 0.20 N (newton) and equal to or less than 1.20 N, more preferably equal to or greater than 0.30 N and equal to or less than 1.00 N, and still more preferably equal to or greater than 0.40 N and equal to or less than 0.80 N.

The temperature and humidity of the environment in which rewinding is performed is not particularly limited.

The temperature of the storage environment of the magnetic tape in a state of being wound around the reel is preferably equal to or lower than 60° C., more preferably equal to or lower than 50° C., and still more preferably equal to or lower than 40° C. The temperature of the storage environment is preferably equal to or higher than 10° C., more preferably equal to or higher than 20° C., and still more preferably equal to or higher than 30° C. The temperature of the storage environment can be, for example, a temperature in the magnetic tape cartridge in which the magnetic tape is accommodated, an atmospheric temperature of an environment in which the magnetic tape cartridge is stored, a temperature in the housing of the magnetic tape device in which the magnetic tape is accommodated, an atmospheric temperature of an environment in which such a device is stored, a temperature in the housing of the winding device in which the magnetic tape is accommodated, or an atmospheric temperature of an environment in which a such device is stored. As an example, the temperature in the housing of the magnetic tape device is monitored by the thermohygrometer (for example, the thermohygrometer 610 in FIG. 6) shown in the drawing described above, and the temperature and humidity of the environment in which the magnetic tape device is disposed is changed based on a monitoring result as necessary, whereby temperature control in the housing of the magnetic tape device can be performed.

The magnetic tape after the acquisition of the magnetic tape width described above is subjected to pre-rewinding storage (S3).

After a given period has elapsed from the start of pre-rewinding storage, the magnetic tape width is measured (S4). In regard to a measurement method of the magnetic tape width, the above description can be referred to. The width of the magnetic tape is measured at regular intervals, and rewinding is preferably performed before large tape width deformation occurs. The interval at which the measurement of the magnetic tape width is performed is preferably equal to or less than every six months, more preferably equal to or less than every month, and still more preferably equal to or less than every week.

The measurement result regarding the magnetic tape width described above is compared with the measurement result regarding the magnetic tape width before pre-rewinding storage, and in a case where the tape width difference from the tape width before pre-rewinding storage exceeds the threshold value, rewinding is performed (S5), and the magnetic tape is subjected to post-rewinding storage (S6).

After a given period has elapsed from the start of post-rewinding storage, the magnetic tape width is measured (S7). In regard to a measurement method of the magnetic tape width in this case, the above description can also be referred to. Even in this case, the width of the magnetic tape is measured at regular intervals and unwinding described below is preferably performed before large tape width deformation occurs. In regard to the interval at which the measurement of the magnetic tape width is performed, the above description can be referred to.

The measurement result regarding the magnetic tape width described above is compared with the measurement result regarding the magnetic tape width before pre-rewinding storage, and in a case where the tape width difference from the tape width before pre-rewinding storage is equal to or less than the threshold value, the magnetic tape is unwound to the original reel (S8). As described above, an embodiment in which unwinding to the original reel is not performed can be made. Recording or reproduction of data is performed with respect to the magnetic tape after being subjected to post-rewinding storage in this manner, it is possible to suppress the occurrence of the phenomenon of recording failure, reproduction failure, or the like.

In one embodiment, a storage period of post-rewinding storage is, for example, preferably equal to or greater than three days, more preferably equal to or greater than five days, and still more preferably equal to or greater than ten days. In one embodiment, the storage period of post-rewinding storage can be, for example, equal to or less than 100 days, equal to or less than 80 days, and still more preferably equal to or less than 60 days or equal to or less than 40 days.

The winding tension and/or the storage period may be determined in consideration of easiness of deformation of the magnetic tape subjected to storage, the storage environment, and the like. For example, in regard to an easily deformable magnetic tape, since large tape deformation easily occurs during pre-rewinding storage, the winding tension in rewinding is increased, and the period of post-rewinding storage is extended, whereby creep deformation in a direction opposite to pre-rewinding storage can be largely generated in post-rewinding storage. In a case where the storage environment is a high temperature and high humidity environment in which tape width deformation easily occurs, the interval at which the measurement of the tape width is performed is shortened, whereby rewinding before large deformation is generated in pre-rewinding storage and/or the generation of large deformation greater than a desired deformation amount in post-rewinding storage can be suppressed.

[Magnetic Tape Control Device]

An aspect of the present invention relates to a magnetic tape control device including a rewinding control unit that transmits rewinding execution information, and a drive unit that receives the rewinding execution information and starts running of the magnetic tape stored in a state of being wound around the reel, to execute rewinding of the magnetic tape. The rewinding is winding the magnetic tape around a reel different from or the same reel as the reel around which the magnetic tape is wound before rewinding such that an end that is a tape outside end before rewinding is turned into a tape inside end, and an end that is a tape inside end before rewinding is turned into a tape outside end.

The rewinding control unit can determine a transmission time of the rewinding execution information based on a measurement result regarding a tape width of the magnetic tape stored in a state of being wound around the reel before rewinding. In one embodiment, the rewinding control unit can determine the transmission time of the rewinding execution information based on a comparison result of comparing the measurement result regarding the tape width of the magnetic tape stored in a state of being wound around the reel before rewinding with a measurement result regarding a tape width of the magnetic tape before being stored in a state of being wound around the reel. For such comparison, the rewinding control unit can read out the measurement result regarding the tape width of the magnetic tape before being stored in a state of being wound around the reel, from the data storage region where the measurement result is stored.

In regard to the details of the magnetic tape control device, the above description regarding the magnetic tape control system can be referred to.

EXAMPLES

Hereinafter, the present invention will be described based on examples. Note that the present invention is not limited to an embodiment shown in the example.

Comparative Example 1

A linear tape-open (LTO)-8 cartridge in which a coating type magnetic tape is accommodated, an LTO-8 drive, and a computer for drive control are used. The LTO-8 cartridge is a magnetic tape cartridge (single reel type) conforming to the specification of LTO-8, and the LTO-8 drive is a magnetic tape device conforming to the specification of LTO-8.

The drive in which the LTO-8 cartridge is inserted into the housing is placed in an environment controlled to an atmospheric temperature of 23° C.±2° C. and relative humidity of 50%±5% for 24 hours or more to be adjusted to the same environment, and a regulated capacity of data is recorded on the magnetic tape accommodated in the LTO-8 cartridge under the same environment.

The LTO-8 cartridge is extracted from the housing of the drive and is stored in an environment of an atmospheric temperature of 60° C. and relative humidity of 20% for 30 days.

The LTO-8 cartridge is inserted into the housing of the same drive as recording, the drive is placed in an environment controlled to an atmospheric temperature of 23° C.±2° C. and relative humidity of 50%±5% for 24 hours to be adjusted to the same environment, and then, reading of all recorded data recorded on the magnetic tape is attempted. As a result, since the tape width difference between during recording and during reading of data exceeds an allowable value set in the control device of the drive in the middle of reading of data, an error occurs in reproduced data and the running of the drive is stopped (that is, reading failure occurs).

Example 1

An LTO-8 cartridge that has a regulated capacity of data is recorded on the magnetic tape by the LTO-8 drive like Comparative Example 1 is stored in an environment of an atmospheric temperature of 60° C. and relative humidity of 20% for 30 days, and then, the total length of the magnetic tape in the cartridge is wound around a reel of a separate LTO-8 cartridge in a state in which no tape is wound, using a reel tester (rewinding). The winding tension during rewinding is 0.56 N, the tape running speed during rewinding is 4 m/s, and rewinding is executed in an environment of an atmospheric temperature of 23° C.±2° C. and relative humidity of 50%±5%. In performing rewinding, a leader pin and a leader tape are removed. After the rewinding, the magnetic tape in a state of being wound around the reel is stored in an environment of a temperature of 60° C. and relative humidity of 20% for 30 days (post-rewinding storage), and thereafter, the magnetic tape is unwound to the cartridge reel of the original LTO-8 cartridge using the reel tester and is accommodated in the LTO-8 cartridge. Unwinding is performed under the same condition as during rewinding.

After unwinding, the leader pin and the leader tape are attached to the magnetic tape again. The LTO-8 cartridge in which the magnetic tape is accommodated is inserted into the housing of the same drive as recording, the drive is placed in an environment controlled to an atmospheric temperature of 23° C.±2° C. and relative humidity of 50%±5% for 24 hours or more to be adjusted to the same environment, and then, reading of all recorded data recorded on the magnetic tape is attempted. As a result, all recorded data can be normally read.

Example 2

The procedure is the same as in Example 1 except that the storage period after rewinding is changed to 20 days, and all recorded data can be normally read.

Example 3

The procedure is the same as in Example 1 except that the storage period after rewinding is changed to 10 days, and all recorded data can be normally read.

An example of a method of measuring an interval between two adjacent servo bands with a data band interposed therebetween as a measurement result regarding a tape width of a magnetic tape using a servo signal and a servo signal reading element will be described below.

As the magnetic tape, a magnetic tape that has a data band, a servo band, and a guide band in the disposition conforming to an LTO Ultrium format, and has a servo pattern (timing-based servo pattern) having the disposition and shape conforming to the LTO Ultrium format on the servo band is used. The servo pattern is a servo pattern conforming to the description of Japanese Industrial Standards (JIS) X6175: 2006 and Standard ECMA-319 (June 2001).

The interval of two adjacent servo bands with the data band interposed therebetween is obtained as follows.

To obtain the interval of two adjacent servo bands with the data band interposed therebetween, the dimension of the servo pattern is needed. The standard of the dimension of the servo pattern is different depending on generation of LTO. Accordingly, first, an average distance AC between corresponding four stripes of the A burst and the C burst and an azimuth angle α of the servo pattern are measured using a magnetic force microscope or the like.

Next, the servo pattern formed on the magnetic tape is read sequentially along the tape longitudinal direction using a reel tester and a servo head comprising two servo signal reading elements (hereinafter, one servo signal reading element is referred to as an upper servo signal reading element, and the other servo signal reading element is referred to as a lower servo signal reading element) fixed at an interval in a direction perpendicular to the longitudinal direction of the magnetic tape. An average time between five stripes corresponding to the A burst and the B burst over a length of one LPOS word is defined as a. An average time of the corresponding four stripes of the A burst and the C burst over a length of 1 m is defined as b. In this case, a value that is defined by $AC \times (\frac{1}{2} - a/b)/(2 \times \tan(a))$ represents a position error signal (PES) of a reading position in the width direction based on the servo signal obtained by the servo signal reading element. Reading of the servo pattern is simultaneously performed by the upper and lower two servo signal reading elements. A value of the PES obtained by the upper servo signal reading element is referred to as PES1, and a value of the PES obtained by the lower servo signal reading element is referred to as PES2. As "PES2-PES1", the interval between two adjacent servo bands with a data band interposed therebetween can be obtained. This is because the upper and lower servo signal reading elements are fixed to the servo head and the interval thereof is not changed.

An aspect of the present invention is useful in a technical field of various kinds of data storage.

What is claimed is:

1. A magnetic tape control system that is configured to execute
   pre-rewinding storage of storing a magnetic tape in a state of being wound around a reel, said pre-rewinding storage being performed after data is recorded on the magnetic tape,
   and
   post-rewinding storage of storing the magnetic tape in a state of being rewound around a reel different from or the same reel as the reel after the pre-rewinding storage such that an end that is a tape outside end during the pre-rewinding storage is turned into a tape inside end and an end that is a tape inside end during the pre-rewinding storage is turned into a tape outside end;
   wherein a Measurement 1 regarding a tape width of the magnetic tape is performed after data is recorded on the magnetic tape and before pre-rewinding storage;
   after a given period has elapsed from the start of pre-rewinding storage, a Measurement 2 regarding a tape width of the magnetic tape is performed, with no data being recorded on the magnetic tape during said Measurement 2;
   an execution time of the post-rewinding storage is determined based on a comparison result of comparing a measurement result regarding the tape width of the magnetic tape obtained by Measurement 1 with a measurement result regarding the tape width of the magnetic tape obtained by Measurement 2; and
   the measurement results regarding the tape width of the magnetic tape obtained by Measurements 1 and 2 being selected from the group consisting of measured values obtained by measuring the tape width of the magnetic tape and measured values obtained by measuring an interval of two adjacent servo bands with a data band interposed therebetween on the magnetic tape.

2. The magnetic tape control system according to claim 1, wherein the pre-rewinding storage is executed after reproduction of data recorded on the magnetic tape is performed.

3. The magnetic tape control system according to claim 1, wherein the measurement result regarding the tape width of the magnetic tape before being subjected to the pre-rewinding storage is stored in a data storage region of the magnetic tape control system.

4. The magnetic tape control system according to claim 3, wherein the data storage region is a storage medium different from the magnetic tape.

5. The magnetic tape control system according to claim 4, wherein the storage medium is a cartridge memory in a magnetic tape cartridge.

6. The magnetic tape control system according to claim 3, wherein the data storage region is a partial region of the magnetic tape.

7. The magnetic tape control system according to claim 1, wherein the magnetic tape is a magnetic tape on which data is recorded at a track pitch equal to or less than 2.0 µm.

8. The magnetic tape control system according to claim 1, wherein the reel around which the magnetic tape is wound by the rewinding is a reel different from the reel around which the magnetic tape is wound before the rewinding.

9. The magnetic tape control system according to claim 8, wherein the reel around which the magnetic tape is wound by the rewinding and the reel around which the magnetic tape is wound before the rewinding are reels that are accommodated in the same magnetic tape cartridge.

10. The magnetic tape control system according to claim 8, wherein, out of the reel around which the magnetic tape is wound by the rewinding and the reel around which the magnetic tape is wound before the rewinding, one reel is a cartridge reel of a magnetic tape cartridge, and the other reel is a reel around which the magnetic tape is wound during recording and reproduction.

11. The magnetic tape control system according to claim 10, wherein the other reel is a winding reel that is provided in a magnetic tape device including a magnetic head.

12. The magnetic tape control system according to claim 10, wherein the other reel is a cartridge reel of a magnetic tape cartridge different from the magnetic tape cartridge having the one cartridge reel.

13. The magnetic tape control system according to claim 8, wherein the reel around which the magnetic tape is wound by the rewinding and the reel around which the magnetic tape is wound before the rewinding are reels that are provided in a magnetic tape device including a magnetic head.

14. The magnetic tape control system according to claim 8, wherein, out of the reel around which the magnetic tape is wound by the rewinding and the reel around which the magnetic tape is wound before the rewinding, one reel is a cartridge reel of a magnetic tape cartridge, and the other reel is a winding reel that is provided in a winding device.

15. The magnetic tape control system according to claim 1, comprising:
    a rewinding control unit that transmits rewinding execution information; and
    a drive unit that receives the rewinding execution information and starts running of the magnetic tape to execute the rewinding.

16. A magnetic tape control device comprising:
a rewinding control unit configured to transmit rewinding execution information; and
a drive unit configured to receive the rewinding execution information and starts running of a magnetic tape stored in a state of being wound around a reel, to execute rewinding of the magnetic tape,
wherein the rewinding is winding the magnetic tape around a reel different from or the same reel as the reel around which the magnetic tape is wound before the rewinding such that an end that is a tape outside end before the rewinding is turned into a tape inside end and an end that is a tape inside end before the rewinding is turned into a tape outside end;
the rewinding control unit is configured to determine a transmission time of the rewinding execution information based on a comparison result of comparing a measurement result regarding a tape width of the magnetic tape that was stored in a state of being wound around the reel before the rewinding with a measurement result regarding a tape width of the magnetic tape before being stored in a state of being wound around the reel;
the measurement result regarding a tape width of the magnetic tape before being stored in a state of being wound around the reel being a measurement result of a Measurement 1 which is performed after data is recorded on the magnetic tape and before being stored in a state of being wound around the reel;
the measurement result regarding a tape width of the magnetic tape that was stored in a state of being wound around the reel before the rewinding is a measurement result of a Measurement 2 which is performed to the magnetic tape that was stored in a state of being wound around the reel for a given period before the rewinding, with no data being recorded on the magnetic tape during said Measurement 2; and
the measurement results regarding the tape width of the magnetic tape obtained by Measurements 1 and 2 being selected from the group consisting of measured values obtained by measuring the tape width of the magnetic tape and measured values obtained by measuring an interval of two adjacent servo bands with a data band interposed therebetween on the magnetic tape.

\* \* \* \* \*